(12) United States Patent
Wang et al.

(10) Patent No.: US 12,170,988 B2
(45) Date of Patent: Dec. 17, 2024

(54) DIRECT CURRENT (DC) TONE INDICATION IN SIDELINK

(71) Applicant: QUALCOMM Incorporated, San Diego, CA (US)

(72) Inventors: Hua Wang, Basking Ridge, NJ (US); Sony Akkarakaran, Poway, CA (US); Peter Gaal, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 17/493,624

(22) Filed: Oct. 4, 2021

(65) Prior Publication Data

US 2022/0110124 A1    Apr. 7, 2022

Related U.S. Application Data

(60) Provisional application No. 63/087,720, filed on Oct. 5, 2020.

(51) Int. Cl.
*H04W 72/0453* (2023.01)
*H04W 92/18* (2009.01)

(52) U.S. Cl.
CPC ........ *H04W 72/0453* (2013.01); *H04W 92/18* (2013.01)

(58) Field of Classification Search
CPC . H04W 72/0453; H04W 92/18; H04W 76/23; H04L 5/1469; H04L 5/0091; H04L 5/0053; H04L 5/0005; H04L 5/0007; H04L 5/001
See application file for complete search history.

(56) References Cited

U.S. PATENT DOCUMENTS

| | | | |
|---|---|---|---|
| 8,630,598 B2 | 1/2014 | Laroia et al. | |
| 2018/0091350 A1* | 3/2018 | Akkarakaran | .... H04L 27/26134 |
| 2019/0313394 A1 | 10/2019 | Kubota et al. | |
| 2020/0015230 A1* | 1/2020 | Chae | ...................... H04L 5/0044 |
| 2021/0153200 A1* | 5/2021 | Kwon | ................. H04L 27/2601 |
| 2021/0160121 A1* | 5/2021 | Jeon | ...................... H04J 11/0023 |

(Continued)

OTHER PUBLICATIONS

International Search Report and Written Opinion—PCT/US2021/053596—ISA/EPO—dated Jan. 10, 2022.

(Continued)

*Primary Examiner* — Yu-Wen Chang
(74) *Attorney, Agent, or Firm* — Loza & Loza, LLP/QUALCOMM Incorporated

(57) ABSTRACT

Aspects relate to direct current (DC) tone indication on the sidelink A wireless communication device (e.g., a UE) may transmit an indication of its sidelink DC tone to one or more other UEs via respective sidelinks. In an example, a transmitting UE may transmit an indication of its sidelink DC tone within second stage sidelink control information included within a data region of a slot. A receiving UE may further transmit an indication of its sidelink DC tone to a transmitting UE over a sidelink between the transmitting UE and receiving UE or a base station in wireless communication with the transmitting and receiving UEs may provide the indication of the sidelink DC tone of the receiving UE to the transmitting UE.

36 Claims, 22 Drawing Sheets

(56) References Cited

U.S. PATENT DOCUMENTS

| | | | |
|---|---|---|---|
| 2022/0263628 A1* | 8/2022 | Liu | H04L 5/0053 |
| 2023/0111483 A1* | 4/2023 | Hong | H04L 5/0044 |
| | | | 705/329 |
| 2023/0131328 A1* | 4/2023 | Zhang | H04L 5/0098 |
| | | | 370/329 |

OTHER PUBLICATIONS

Qualcomm Incorporated: "PT-RS Considerations", 3GPP Draft, R1-1807605, 3GPP TSG RAN WG1 Meeting #93, 3rd Generation Partnership Project (3GPP), Mobile Competence Centre, 650, Route Des Lucioles, F-06921 Sophia-Antipolis Cedex, France, vol. RAN WG1. No. Busan, Korea, May 21, 2018-May 25, 2018, May 24, 2018 (May 24, 2018), XP051463247, pp. 1-6, Retrieved from the Internet: URL:http://www.3gpp.org/ftp/tsg%5Fran/WG1%5FRL1/TSGR1%5F93/Docs [retrieved on May 24, 2018] Sections 2-4, Section 3, p. 3.

3GPP TS 38.331: "3rd Generation Partnership Project, Technical Specification Group Radio Access Network, NR, Radio Resource Control (RRC) Protocol Specification (Release 16)", 3rd Generation Partnership Project, Mobile Competence Centre, 650, Route Des Lucioles, F-06921 Sophia-Antipolis Cedex, France, vol. Ran WG2, No. V16.1.0,. Jul. 24, 2020, pp. 1-910, XP051925836, p. 382-388 paragraph 5.6 UE capabilities—p. 192, paragraph 5.7.4.3, figures 5.6.1.1-1, 5.7.4.1-1, sections 6.3.2 and 6.3.5.

\* cited by examiner

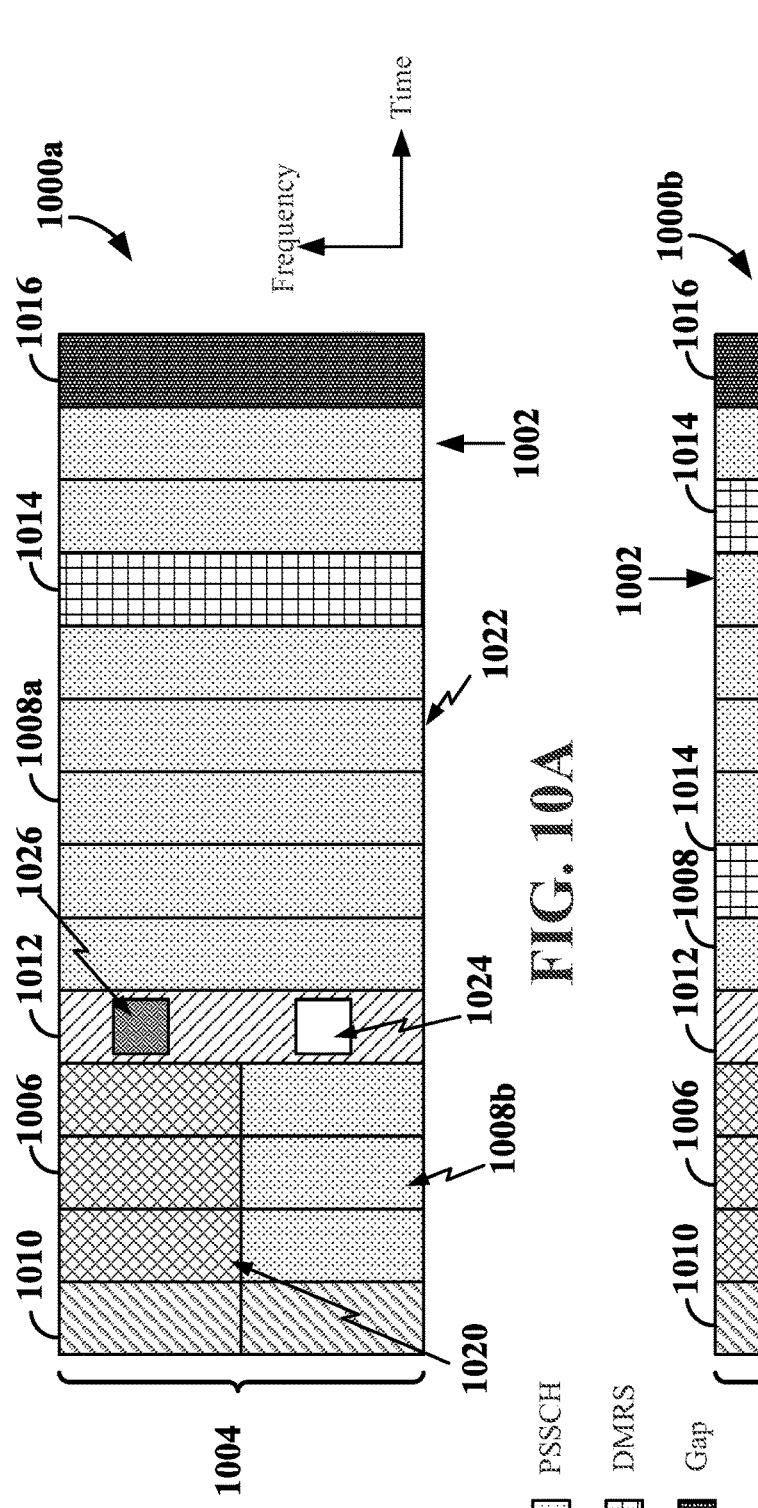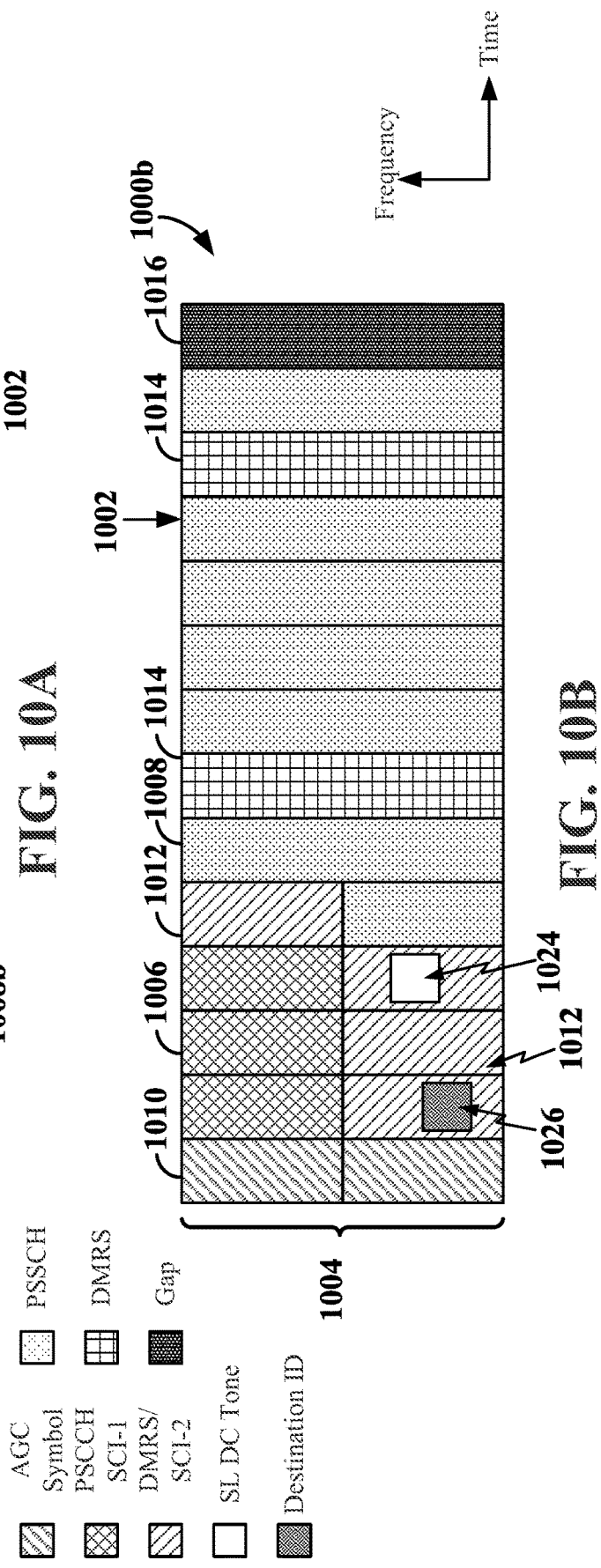
FIG. 10A
FIG. 10B

DIRECT CURRENT (DC) TONE INDICATION IN SIDELINK

CROSS-REFERENCE TO RELATED APPLICATIONS

The present application for patent claims priority to and the benefit of U.S. Provisional Application No. 63/087,720, filed Oct. 5, 2020, and assigned to the assignee hereof and hereby expressly incorporated by reference herein as if fully set forth below in its entirety and for all applicable purposes.

INTRODUCTION

The technology discussed below relates generally to wireless communication networks, and more particularly, to providing indications of sidelink direct current (DC) tones of wireless communication devices to other wireless communication devices.

Wireless communication between devices may be facilitated by various network configurations. In one configuration, a cellular network may enable wireless communication devices (e.g., user equipment (UEs)) to communicate with one another through signaling with a nearby base station or cell. Another wireless communication network configuration is a device to device (D2D) network, in which wireless communication devices may signal one another directly, rather than via an intermediary base station or cell. For example, D2D communication networks may utilize sidelink signaling to facilitate the direct communication between wireless communication devices. In some sidelink network configurations, wireless communication devices may further communicate in a cellular network, generally under the control of a base station. Thus, the wireless communication devices may be configured for uplink and downlink signaling via a base station and further for sidelink signaling directly between the wireless communication devices without transmissions passing through the base station.

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a first wireless communication device configured for wireless communication is disclosed. The first wireless communication device includes a memory and a processor coupled to the memory. The processor and the memory are configured to transmit a first indication of a first sidelink direct current (DC) tone of the first wireless communication device to a second wireless communication device and receive a second indication of a second sidelink DC tone of the second wireless communication device.

Another example provides a second wireless communication device configured for wireless communication. The second wireless communication device includes a memory and a processor coupled to the memory. The processor and the memory are configured to receive a first indication of a first sidelink direct current (DC) tone of a first wireless communication device from the first wireless communication device and provide a second indication of a second sidelink DC tone of the second wireless communication device to the first wireless communication device.

Another example provides a radio access network (RAN) entity configured for wireless communication. The RAN entity includes a memory and a processor coupled to the memory. The processor and the memory are configured to receive a first indication of a first sidelink direct current (DC) tone of a first wireless communication device from the first wireless communication device and transmit the first indication of the first sidelink DC tone of the first wireless communication device to a second wireless communication device.

Another example provides a method of sidelink wireless communication at a first wireless communication device. The method includes transmitting a first indication of a first sidelink direct current (DC) tone of the first wireless communication device to a second wireless communication device, and receiving a second indication of a second sidelink DC tone of the second wireless communication device.

Another example provides a method of sidelink wireless communication at a second wireless communication device. The method includes receiving a first indication of a first sidelink direct current (DC) tone of a first wireless communication device from the first wireless communication device, and providing a second indication of a second sidelink DC tone of the second wireless communication device to the first wireless communication device.

Another example provides a method of wireless communication at a radio access network (RAN) entity. The method includes receiving a first indication of a first sidelink direct current (DC) tone of a first wireless communication device from the first wireless communication device, and transmitting the first indication of the first sidelink DC tone of the first wireless communication device to a second wireless communication device.

Another example provides a first wireless communication device configured for wireless communication. The first wireless communication device can include means for transmitting a first indication of a first sidelink direct current (DC) tone of the first wireless communication device to a second wireless communication device, and means for receiving a second indication of a second sidelink DC tone of the second wireless communication device.

Another example provides a second wireless communication device configured for wireless communication. The second wireless communication device can include means for receiving a first indication of a first sidelink direct current (DC) tone of a first wireless communication device from the first wireless communication device, and means for providing a second indication of a second sidelink DC tone of the second wireless communication device to the first wireless communication device.

Another example provides a radio access network (RAN) entity configured for wireless communication. The RAN entity can include means for receiving a first indication of a first sidelink direct current (DC) tone of a first wireless communication device from the first wireless communication device, and means for transmitting the first indication of the first sidelink DC tone of the first wireless communication device to a second wireless communication device.

Another example provides a non-transitory computer-readable medium including instructions for causing one or more processors of a first wireless communication device to transmit a first indication of a first sidelink direct current (DC) tone of the first wireless communication device to a second wireless communication device and receive a second indication of a second sidelink DC tone of the second wireless communication device.

Another example provides a non-transitory computer-readable medium including instructions for causing one or more processors of a second wireless communication device to receive a first indication of a first sidelink direct current (DC) tone of a first wireless communication device from the first wireless communication device and provide a second indication of a second sidelink DC tone of the second wireless communication device to the first wireless communication device.

Another example provides a non-transitory computer-readable medium including instructions for causing one or more processors of a radio access network (RAN) entity to receive a first indication of a first sidelink direct current (DC) tone of a first wireless communication device from the first wireless communication device and transmit the first indication of the first sidelink DC tone of the first wireless communication device to a second wireless communication device.

Another example provides a method of sidelink wireless communication at a first wireless communication device. The method can include identifying a first sidelink direct current (DC) tone of the first wireless communication device, transmitting a first indication of the first sidelink DC tone of the first wireless communication device to a second wireless communication device via a sidelink between the first wireless communication device and the second wireless communication device, and receiving a second indication of a second sidelink DC tone of the second wireless communication device.

Another example provides a first wireless communication device in a wireless communication network. The first wireless communication device includes a memory and a processor coupled to the memory. The processor and the memory can be configured to identify a first sidelink direct current (DC) tone of the first wireless communication device, transmit a first indication of the first sidelink DC tone of the first wireless communication device to a second wireless communication device via a sidelink between the first wireless communication device and the second wireless communication device, and receive a second indication of a second sidelink DC tone of the second wireless communication device.

Another example provides a first wireless communication device in a wireless communication network. The first wireless communication device can include means for identifying a first sidelink direct current (DC) tone of the first wireless communication device, means for transmitting a first indication of the first sidelink DC tone of the first wireless communication device to a second wireless communication device via a sidelink between the first wireless communication device and the second wireless communication device, and means for receiving a second indication of a second sidelink DC tone of the second wireless communication device.

Another example provides a non-transitory computer-readable medium including code for causing one or more processors of a first wireless communication device to identify a first sidelink direct current (DC) tone of the first wireless communication device, transmit a first indication of the first sidelink DC tone of the first wireless communication device to a second wireless communication device via a sidelink between the first wireless communication device and the second wireless communication device, and receive a second indication of a second sidelink DC tone of the second wireless communication device.

In another example, a method of sidelink wireless communication at a first wireless communication device is disclosed. The method can include identifying a first sidelink direct current (DC) tone of the first wireless communication device, receiving a first indication of a second sidelink DC tone of a second wireless communication device from the second wireless communication device via a sidelink between the first wireless communication device and the second wireless communication device, and providing a second indication of the first sidelink DC tone of the first wireless communication device to the second wireless communication device.

Another example provides a first wireless communication device in a wireless communication network. The first wireless communication device includes a memory and a processor coupled to the memory. The processor and the memory can be configured to identify a first sidelink direct current (DC) tone of the first wireless communication device, receive a first indication of a second sidelink DC tone of a second wireless communication device from the second wireless communication device via a sidelink between the first wireless communication device and the second wireless communication device, and provide a second indication of the first sidelink DC tone of the first wireless communication device to the second wireless communication device.

Another example provides a first wireless communication device in a wireless communication network. The first wireless communication device can include means for identifying a first sidelink direct current (DC) tone of the first wireless communication device, means for receiving a first indication of a second sidelink DC tone of a second wireless communication device from the second wireless communication device via a sidelink between the first wireless communication device and the second wireless communication device, and means for providing a second indication of the first sidelink DC tone of the first wireless communication device to the second wireless communication device.

Another example provides a non-transitory computer-readable medium including code for causing one or more processors of a first wireless communication device to identify a first sidelink direct current (DC) tone of the first wireless communication device, receive a first indication of a second sidelink DC tone of a second wireless communication device from the second wireless communication device via a sidelink between the first wireless communication device and the second wireless communication device, and provide a second indication of the first sidelink DC tone of the first wireless communication device to the second wireless communication device.

These and other aspects will become more fully understood upon a review of the detailed description, which follows. Other aspects, features, and examples will become apparent to those of ordinary skill in the art, upon reviewing the following description of specific, exemplary aspects of in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects, such exemplary aspects can be implemented in various devices, systems, and methods.

BRIEF DESCRIPTION OF THE DRAWINGS

FIGS. 10A and 10B illustrate examples of sidelink slot structures including a DC tone indication according to some aspects.

DETAILED DESCRIPTION

Figure 1:
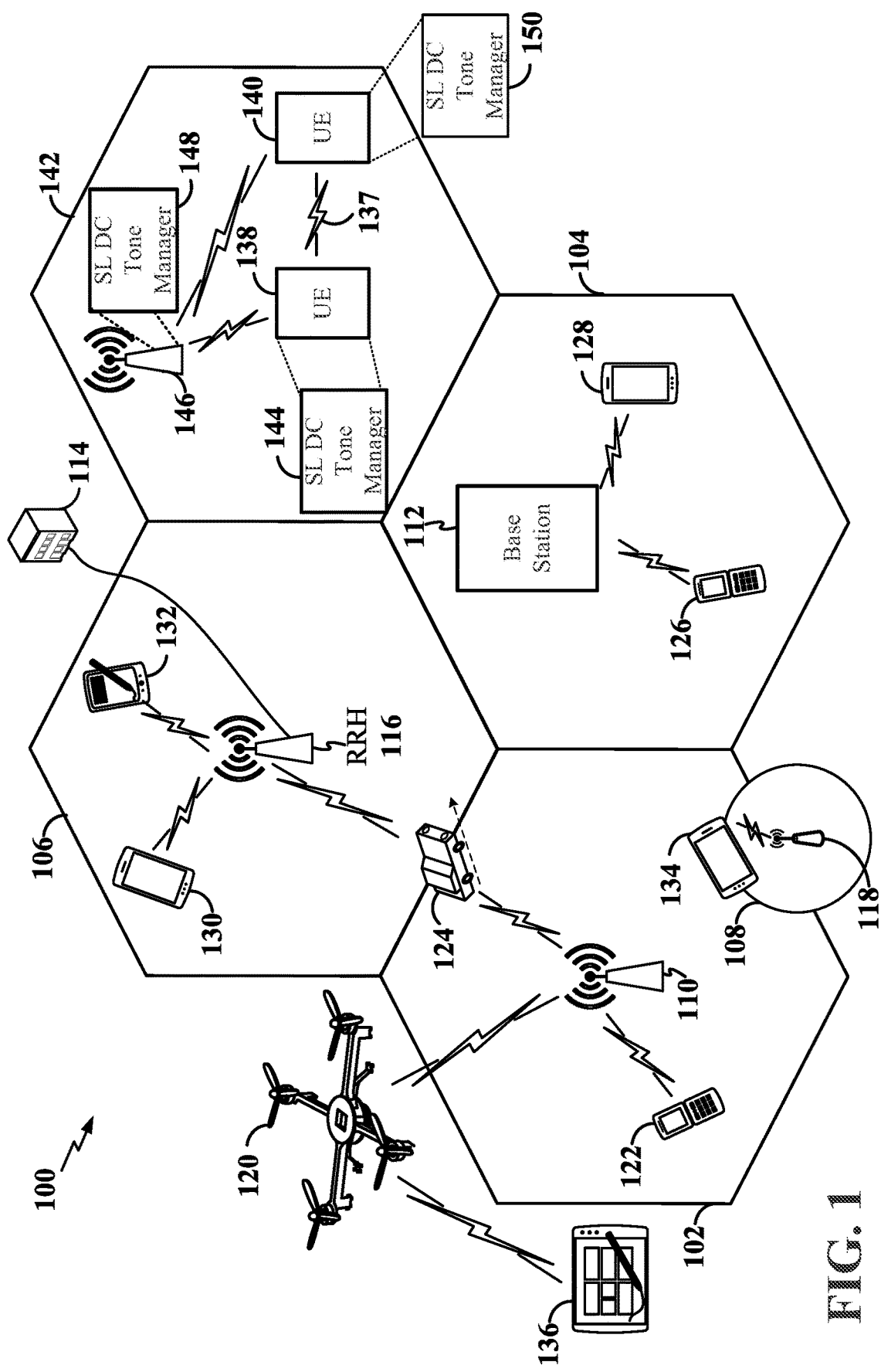
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and features are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip devices and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (base station and UE), end-user devices, etc. of varying sizes, shapes and constitution.

In 5G New Radio (NR) network configurations, including cellular network configurations and sidelink network configurations, interference resulting from local oscillator (LO) leakage may be observed on a center subcarrier of a configured bandwidth. For example, during up-conversion or down-conversion of an analog signal, the LO signal may leak into an input of the device. The leaked signal may generate an additional direct current (DC) component that may interfere with a radio frequency (RF) signal mapped onto the center subcarrier. The center subcarrier, which may be referred to herein as a direct current (DC) tone, may be device-specific based on the radio frequency (RF) implementation and supported system bandwidth of the device. To minimize distortion (DC offset) from the DC tone, the DC tone may be configured as an empty or null tone, and therefore, not utilized in transmissions.

Sidelink communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2. SCI-1 may be transmitted on a physical sidelink control channel (PSCCH). SCI-1 may include information for resource allocation of a sidelink resource and for decoding of the second stage of sidelink control information (i.e., SCI-2). SCI-2 may be transmitted within the PSSCH and may contain information for decoding the PSSCH.

Each sidelink resource allocated to a PSSCH may correspond to, for example, at least one sub-channel in the frequency domain and at least one slot in the time domain. Within a sidelink sub-channel, there may be sidelink DC tone(s) of one or more wireless communication devices. For example, a sidelink sub-channel may contain a sidelink DC tone of a transmitting wireless communication device (e.g., transmitting UE) and/or a receiving wireless communication device (e.g., receiving UE). Transmissions from the transmitting UE to the receiving UE may suffer from higher interference on the sidelink DC tones than other tones due to DC offset. Similarly, transmissions from the receiving UE to the transmitting UE may also suffer from higher interference on the sidelink DC tones.

Various aspects of the disclosure relate to sidelink DC tone indication of wireless communication devices. A wireless communication device (e.g., a UE) may transmit an indication of its sidelink DC tone to one or more other UEs via respective sidelinks. In an example, a transmitting UE may transmit an indication of its sidelink DC tone within second stage sidelink control information (SCI-2) included within a data region of a slot. The sidelink DC tone indication included in the SCI-2 may be received and decoded by a plurality of receiving UEs irrespective of a destination identifier (ID) included in the SCI-2. In an example, a receiving UE may transmit an indication of its sidelink DC tone to a transmitting UE over a sidelink between the transmitting and receiving UE. In an example, a base station in wireless communication with the transmitting and receiving UEs may provide the indication of the sidelink DC tone of the receiving UE to the transmitting UE or vice-versa. For example, the transmitting UE may receive a radio resource control (RRC) message from the base station including the indication of the sidelink DC tone of the receiving UE. In examples in which the transmitting UE has multiple sidelinks with multiple receiving UEs, the RRC message may further include an identifier (ID) of the receiving UE (e.g., a device ID) associated with the sidelink DC tone indication.

In some examples, the receiving UE may transmit the indication of its sidelink DC tone within a sidelink medium access control element (MAC-CE). In some examples, the transmitting UE may transmit a request to the receiving UE for the sidelink DC tone of the receiving UE. For example, the transmitting UE may transmit the request for the sidelink DC tone indication of the receiving UE within a sidelink MAC-CE. In some examples, the sidelink DC tone of the transmitting UE is within a sub-channel on which the transmitting UE and receiving UE are communicating. In other examples, the sidelink DC tone of the transmitting UE may be within a different sub-channel other than one on which the transmitting and receiving UEs are communicating. In some examples, the transmitting UE may avoid utilizing the sidelink DC tone of the receiving UE in transmitting sidelink signals to the receiving UE. Similarly, the receiving UE may also avoid utilizing the sidelink DC tone of the transmitting UE in transmitting sidelink signals to the transmitting UE. By avoiding transmission on the sidelink DC tone(s) of the transmitting UE and/or receiving UE, interference on sidelink signals, such as sidelink phase-tracking reference signals (PT-RSs), may be reduced. Reducing interference on the PT-RS can improve the accuracy of phase noise and frequency offset estimation.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, 142, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element or entity in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, base stations 110, 112, and 146 are shown in cells 102, 104, and 142; and a third base station 114 is shown controlling a remote radio head (RRH) 116 in cell 106. That is, a base station can have an integrated antenna or can be connected to an antenna or RRH by feeder cables. In the illustrated example, the cells 102, 104, 106, and 142 may be referred to as macrocells, as the base stations 110, 112, 114, and 146 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114/116, and 146 provide wireless access points to a core network for any number of mobile apparatuses.

FIG. 1 further includes an unmanned aerial vehicle (UAV) 120, such as a quadcopter or drone, which may be configured to function as a base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 via RRH 116; UEs 138 and 140 may be in communication with base station 146; and UE 136 may be in communication with mobile base station 120. Here, each base station 110, 112, 114, 118, 120, and 146 may be configured to provide an access point to a core network (not shown) for all the UEs in the respective cells. In another example, a mobile network node (e.g., UAV 120) may be configured to function as a UE. For example, the UAV 120 may operate within cell 102 by communicating with base station 110.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex (FD).

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station 112) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 126), which may be scheduled entities, may utilize resources allocated by the scheduling entity 112.

Base stations are not the only entities that may function as scheduling entities. That is, in some examples, a UE may function as a scheduling entity, scheduling resources for one or more scheduled entities (e.g., one or more other UEs). For example, two or more UEs (e.g., UEs 138 and 140) may communicate with each other using peer to peer (P2P) or sidelink signals 137 without relaying that communication through a base station (e.g., base station 146). In some examples, the UEs 138 and 140 may each function as a scheduling entity or transmitting sidelink device and/or a scheduled entity or a receiving sidelink device to communicate sidelink signals 137 therebetween without relying on scheduling or control information from a base station (e.g., base station 146). In other examples, the base station 146 may allocate resources to the UEs 138 and 140 for sidelink communication. For example, the UEs 138 and 140 may communicate using sidelink signaling in a P2P network, a device-to-device (D2D) network, vehicle-to-vehicle (V2V) network, a vehicle-to-everything (V2X), a mesh network, or other suitable network.

In some examples, a D2D relay framework may be included within a cellular network to facilitate relaying of communication to/from a base station (e.g., base station 146) via D2D links (e.g., sidelink 137). For example, one or more UEs (e.g., UE 138) within the coverage area of the base station 146 may operate as relaying UEs to extend the coverage of the base station 146, improve the transmission reliability to one or more UEs (e.g., UE 140), and/or to allow the base station to recover from a failed UE link due to, for example, blockage or fading.

To facilitate indication of sidelink direct current (DC) tones (e.g., subcarriers) between UEs (e.g., UE 138 and 140) communicating over a sidelink, the UEs 138 and 140 may each include a respective sidelink (SL) DC tone manager 144 and 150. The SL DC tone managers 144 and 150 may be configured to identify a respective sidelink DC tone of the corresponding UEs 138 and 140 and enable communication of the identified sidelink DC tone to each other and/or to other UEs (not shown) communicating therewith over additional sidelinks. In an example, UE 138 may be a transmitting UE and UE 140 may be a receiving UE. In this example, the SL DC tone manager 144 of the transmitting UE may be configured to transmit a request for the sidelink DC tone of the receiving UE 140. The SL DC tone manager 150 of the receiving UE 140 may then transmit an indication of the sidelink DC tone of the receiving UE to the transmitting UE 138. For example, the request for the sidelink DC tone of the receiving UE and the response with the sidelink DC tone of the receiving UE may be transmitted via respective sidelink MAC-CEs. In some examples, the SL DC tone manager 144 of the transmitting UE 138 may further transmit an indication of the sidelink DC tone of the transmitting UE 138 to the receiving UE 140 (and optionally to other receiving UEs). For example, the SL DC tone manager 144 of the transmitting UE 138 may transmit the indication of the sidelink DC tone of the transmitting UE 138 to the receiving UE 140 within second stage sidelink control information (SCI-2) within a data region of a slot.

In some examples, the base station 146 may further include a SL DC tone manager 148 configured to receive an indication of the sidelink DC tone of the receiving UE 140 and to provide the indication of the sidelink DC tone of the receiving UE 140 to the transmitting UE 138. For example, the SL DC tone manager 148 of the base station 146 may be configured to transmit the indication of the sidelink DC tone of the receiving UE 140 to the transmitting UE 138 within a radio resource control (RRC) message. The RRC message may further include an identifier of the receiving UE 140.

Figure 2:
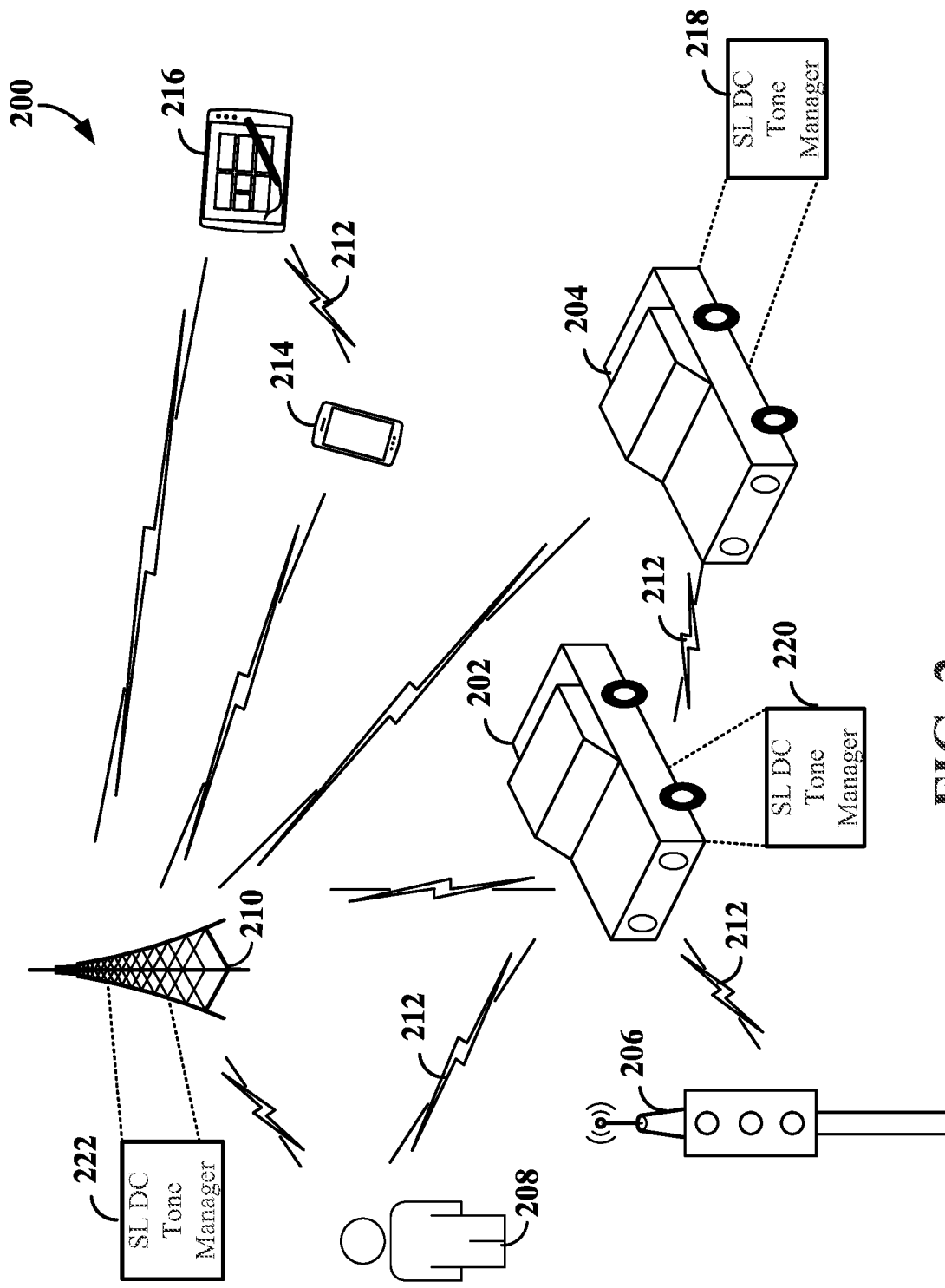
FIG. 2 is a diagram illustrating an example of a wireless communication network employing sidelink communication according to some aspects.

FIG. 2 illustrates an example of a wireless communication network 200 configured to support sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure (e.g., roadside units (RSUs) 206), such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 3GPP, Release 16, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 may occur over a sidelink 212 utilizing a proximity service (ProSe) PC5 interface. In various aspects of the disclosure, the PC5 interface may further be utilized to support D2D sidelink 212 communication in other proximity use cases. Examples of other proximity use cases may include public safety or commercial (e.g., entertainment, education, office, medical, and/or interactive) based proximity services. In the example shown in FIG. 2, ProSe communication may further occur between UEs 214 and 216.

ProSe communication may support different operational scenarios, such as in-coverage, out-of-coverage, and partial coverage. Out-of-coverage refers to a scenario in which UEs (e.g., V-UEs 202 and 204 and P-UE 208) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., UEs 214 and 216) are in communication with the base station 210 (e.g., gNB) via a Uu (e.g., cellular interface) connection to receive ProSe service authorization and provisioning information to support ProSe operations.

To facilitate D2D sidelink communication between, for example, UEs 214 and 216 over the sidelink 212, the UEs 214 and 216 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 212. For example, the discovery signal may be utilized by the UE 216 to measure the signal strength and channel status of a potential sidelink (e.g., sidelink 212) with another UE (e.g., UE 214). The UE 216 may utilize the measurement results to select a UE (e.g., UE 214) for sidelink communication or relay communication.

In 5G NR V2X, sidelink communication may utilize transmission or reception resource pools within one or more bandwidth parts (BWPs). For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., pre-loaded on the UE) or configured by a base station (e.g., base station 210).

In addition, there may be two main resource allocation modes of operation for sidelink (e.g., PC5) communications. In a first mode, Mode 1, a base station (e.g., gNB) 210 may allocate resources to V-UEs (and other V2X devices, such as P-UEs and RSUs) for sidelink communication between the V2X devices in various manners. For example, the base station 210 may allocate sidelink resources dynamically (e.g., a dynamic grant) to V2X devices, in response to requests for sidelink resources from the V2X devices. The base station 210 may further activate preconfigured sidelink grants (e.g., configured grants) for sidelink communication among the V2X devices. In Mode 1, sidelink feedback may be reported back to the base station 210 by a transmitting V2X device.

In a second mode, Mode 2, the V2X devices may autonomously select sidelink resources for sidelink communication therebetween. In some examples, a transmitting V2X device may perform resource/channel sensing to select resources (e.g., sub-channels) on the sidelink channel that are unoccupied. Signaling on the sidelink 212 is the same between the two modes. Therefore, from a receiver's point of view, there is no difference between the modes.

In either Mode 1 or Mode 2, V2X devices (e.g., V-UEs 202 and 204) communicating over a sidelink 212 may be configured to facilitate exchange of sidelink DC tones on each of the V2X devices 202 and 204. In various aspects of the disclosure, the sidelink (SL) DC tone of a receiving V-UE (e.g., Rx UE 202) may be provided to a transmitting V-UE (e.g., Tx UE 204) by the Rx UE 202 and/or the base station 210, depending on whether Mode 1 or Mode 2 is implemented. Here, the SL DC tone may be associated with a BWP configured for sidelink communication that includes a sub-channel on which the Tx UE 204 is communicating with the Rx UE 202. In some examples, the SL DC tone may be within the sub-channel or outside the sub-channel (e.g., within another sub-channel of the configured BWP). In general, the SL DC tone may be located on a particular subcarrier in the configured BWP based on the radio frequency (RF) implementation and supported device bandwidth of the Rx UE 202. In some examples, the SL DC tone may be located on the center subcarrier in the configured BWP. In other examples, the SL DC tone may located on a subcarrier other than the center subcarrier in the configured BWP.

In Mode 2, the Tx UE 204 may include a sidelink (SL) DC tone manager 218 configured to transmit a SL DC tone request to the Rx UE 202, requesting the SL DC tone of the Rx UE 202. In addition, the Rx UE 202 may further include a SL DC tone manager 220 configured to receive the SL DC tone request and to generate and transmit a SL DC tone report to the Tx UE 204 including an indication of the SL DC tone of the Rx UE 202 for the configured BWP. In some examples, the SL DC tone request may be transmitted on a SL MAC-CE within a data region of a slot. In addition, the SL DC tone report may also be transmitted on a SL MAC-CE within a data region of a subsequent slot.

In Mode 1, the base station 210 may further include a SL DC tone manager 222 configured to determine the SL DC tone of the Rx UE 202 and to provide an indication of the SL DC tone of the Rx UE 202 to the Tx UE 204. For example, the SL DC tone manager 222 at the base station 210 may be configured to receive an indication of the SL DC tone of the Rx UE 202 and to transmit the indication of the SL DC tone of the RX UE to the Tx UE 204 within, for example, an RRC message. In some examples, the RRC message may further include an identifier (e.g., device ID) of the Rx UE 202 to enable the SL DC tone manager 218 of the Tx UE 204 to determine which Rx UE 202 is associated with the received SL DC tone in circumstances in which the Tx UE 204 has two or more sidelinks established with two or more UEs (e.g., Rx UE 202 and P-UE 208).

In some examples, the SL DC tone manager 222 of the base station 210 may be configured to receive the SL DC tone of the Rx UE 202 via RRC signaling. For example, the base station 210 may be configured to transmit an RRC setup or reconfiguration message including a CellGroupConf containing a reportUplinkTxDirectCurrent to the Rx UE 202 that enables reporting by the Rx UE 202 of uplink and supplementary uplink DC location information (e.g., normal uplink and supplementary uplink DC tones) upon BWP configuration and BWP reconfiguration. Here, supplementary uplink resources include lower frequency resources than normal uplink resources. Thus, supplementary uplink resources and normal uplink resources each correspond to a different respective uplink frequency band. The Rx UE 202 may further be configured to transmit an RRC reconfiguration complete message including an uplinkTxDirectCurrentList including a list of the Rx UEs 202 DC locations (e.g., uplink DC tones) for the configured serving cells and BWPs, as requested by the base station 210. The SL DC tone manager 222 of the base station 210 may then identify the SL DC tone(s) of the Rx UE 202 for the configured sidelink BWP(s) from the provided uplink DC tones. Thus, in this example, the SL DC tone(s) may correspond to the uplink DC tone(s) for the BWPs configured for sidelink communication.

In either Mode 1 or Mode 2, the SL DC tone manager 218 of the Tx UE 204 may further be configured to transmit an indication of the sidelink DC tone of the Tx UE 204 to the Rx UE 202 (and optionally to other RX UEs, such as P-UE 208). For example, the SL DC tone manager 218 of the Tx UE 204 may transmit the indication of the sidelink DC tone of the Tx UE 204 to the Rx UE 202 within second stage sidelink control information (SCI-2) within a data region of a slot.

Figure 3:
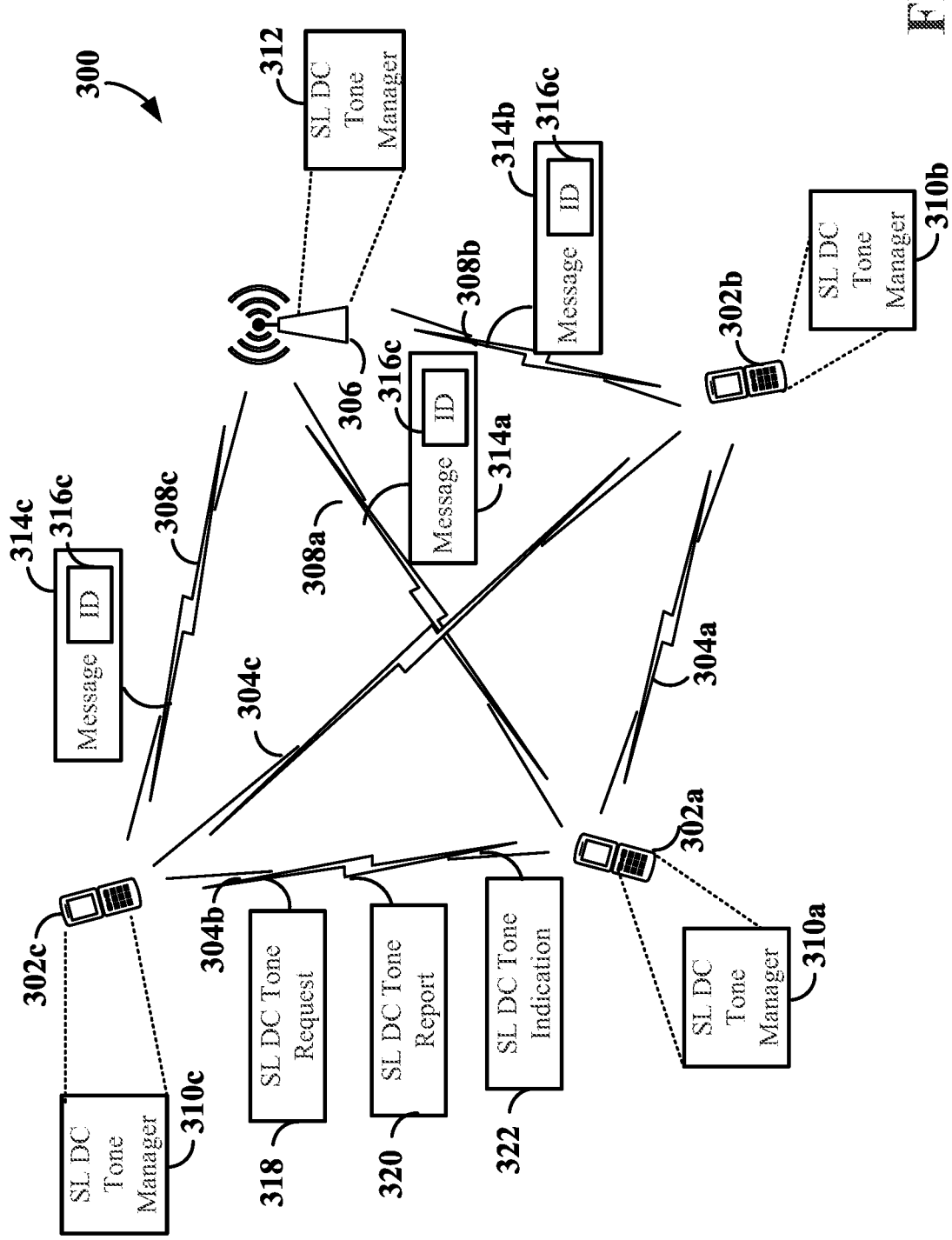
FIG. 3 is a diagram illustrating an example of a wireless communication system for facilitating both cellular and sidelink communication according to some aspects.

FIG. 3 is a diagram illustrating an example of a wireless communication network 300 for facilitating both cellular and sidelink communication. The wireless communication network 300 may correspond, for example, to the RAN illustrated in FIG. 1. The wireless communication network 300 includes a plurality of wireless communication devices 302a, 302b, and 302c and a base station (e.g., eNB or gNB) 306. In some examples, the wireless communication devices 302a, 302b, and 302c may be UEs capable of implementing sidelink communication (e.g., V2X or other D2D).

The wireless communication devices 302a and 302b may communicate over a first sidelink 304a, wireless communication devices 302a and 302c may communicate over a second sidelink 304b, and wireless communication devices 302a and 302c may communicate over a third sidelink 304c. Each of the sidelinks 304a-304c may utilize, for example, a PC5 interface. Wireless communication devices 302a, 302b, and 302c may further communicate with the base station 306 over respective Uu links 308a, 308b, and 308c. The sidelink communication over the sidelinks 304a-304c may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the sidelinks 304a-304c and Uu links 308a-308c, such that resources on the common carrier may be allocated for both sidelink communication between wireless communication devices 302a-302c and cellular communication (e.g., uplink and downlink communication) between the wireless communication devices 302a-302c and the base station 306. For example, the wireless communication network 300 may be configured to support a Mode 1 sidelink (e.g., V2X) network in which resources for both sidelink and cellular communication are scheduled by the base station 306. In other examples in which Mode 2 V2X is implemented on the sidelinks 304a-304c, the wireless communication devices 302a-302c may autonomously select sidelink resources (e.g., from one or more frequency bands or sub-bands designated for sidelink communication) for communication therebetween. In this example, the wireless communication devices 302a-302c may function as both scheduling entities and scheduled entities scheduling sidelink resources for communication with each other.

In some examples, the wireless communication devices 302a-302c may exchange respective SL DC tones therebetween to aid in scheduling sidelink transmissions on the sidelinks 304a-304c. In an example, a wireless communication device (e.g., wireless communication device 302a) may be a transmitting sidelink device (e.g., Tx UE) and wireless communication devices 302b and 302c may be receiving sidelink devices (e.g., Rx UEs). Each of the wireless communication devices 302a-302c may include a respective SL DC tone manager 310a-310c configured to identify a respective DC tone on each of the wireless communication devices 302a-302c and to facilitate exchange of the respective DC tones.

For example, the SL DC tone manager 310a on the transmitting wireless communication device 302a may be configured to transmit a SL DC tone request 318 to the receiving wireless communication device 302b, requesting the SL DC tone of the receiving wireless communication device 302b. In addition, the SL DC tone manager 310b on the receiving wireless communication device 302b may be configured to generate and transmit a SL DC tone report 320 to the transmitting wireless communication device 302a including an indication of the SL DC tone of the receiving wireless communication device 302b for the configured BWP. In some examples, the SL DC tone request 318 may be transmitted on a SL MAC-CE within a data region of a slot. In addition, the SL DC tone report 320 may also be transmitted on a SL MAC-CE within a data region of a subsequent slot. The transmitting wireless communication device 302a may then be configured to avoid scheduling transmissions of sidelink signals (e.g., sidelink phase tracking reference signals (PT-RSs) or other suitable sidelink signals) over the sidelink 304a to the receiving wireless communication device 302b on the sidelink DC tone of the receiving wireless communication device 302b.

The SL DC tone manager 310a on the transmitting wireless communication device 302a may further be configured to transmit an indication 322 of the sidelink DC tone of the transmitting wireless communication device 302a to the receiving wireless communication device 302b or to a plurality of neighbor wireless communication devices 302b and 302c. Here, the neighbor wireless communication devices 302b and 302c may may be defined as those wireless communication devices within a threshold distance from the transmitting wireless communication device 302a or those wireless communication devices for which the reference signal received power (RSRP) of signals transmitted by the transmitting wireless communication device 302a is above a threshold RSRP.

For example, the SL DC tone manager 310a of the transmitting wireless communication device 302a may transmit the sidelink DC tone indication 322 indicating the sidelink DC tone of the transmitting wireless communication device 302a to the receiving wireless communication device 302b within second stage sidelink control information (SCI-2) within a data region of a slot. In some examples, the receiving wireless communication device 302b may be configured to avoid scheduling transmissions of sidelink signals to the transmitting wireless communication device 302a over the sidelink 304a on the sidelink DC tone of the transmitting wireless communication device 302a.

In some examples, the SL DC tone manager 310c of the receiving wireless communication device 302c may also be configured to receive the SCI-2 including the sidelink DC tone of the transmitting wireless communication device 302a. The receiving wireless communication device 302c may further avoid scheduling sidelink transmissions over sidelink 304b or sidelink 304c on the sidelink DC tone of the transmitting wireless communication device 302a.

In some examples, such as when the wireless communication devices 302a-302c are operating in Mode 1 V2X, the base station 306 may include a SL DC tone manager 312 configured to receive the sidelink DC tone of the receiving wireless communication device 302b via Uu link 308b and to transmit the sidelink DC tone of the receiving wireless communication device 302b to the transmitting wireless communication device 302a via Uu link 308a. Similarly, the SL DC tone manager 312 of the base station 306 may be configured to receive the sidelink DC tone of the receiving wireless communication device 302c via Uu link 308c and to transmit the sidelink DC tone of the receiving wireless communication device 302c to the transmitting wireless communication device 302a via Uu link 308a. In addition, the SL DC tone manager 312 of the base station 306 may further be configured to receive the sidelink DC tone of the transmitting wireless communication device 302a via Uu link 308a and to transmit the sidelink DC tone of the transmitting wireless communication device 302a to receiving wireless communication device 302b via Uu link 308b and/or receiving wireless communication device 302c via Uu link 308c. For example, the SL DC tone manager 312 of the base station 306 may transmit the sidelink DC tone of receiving wireless communication device 302b, receiving wireless communication device 302c, and/or transmitting wireless communication device 302a via respective messages 314a, 314b, and 314c, such as RRC messages, MAC-CEs, or DCI. Each message 314a, 314b, and 314c may further include an identifier 316a, 316b, and 316c (e.g., device ID) of the respective wireless communication device 302a, 302b, or 302c associated with the included sidelink DC tone.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
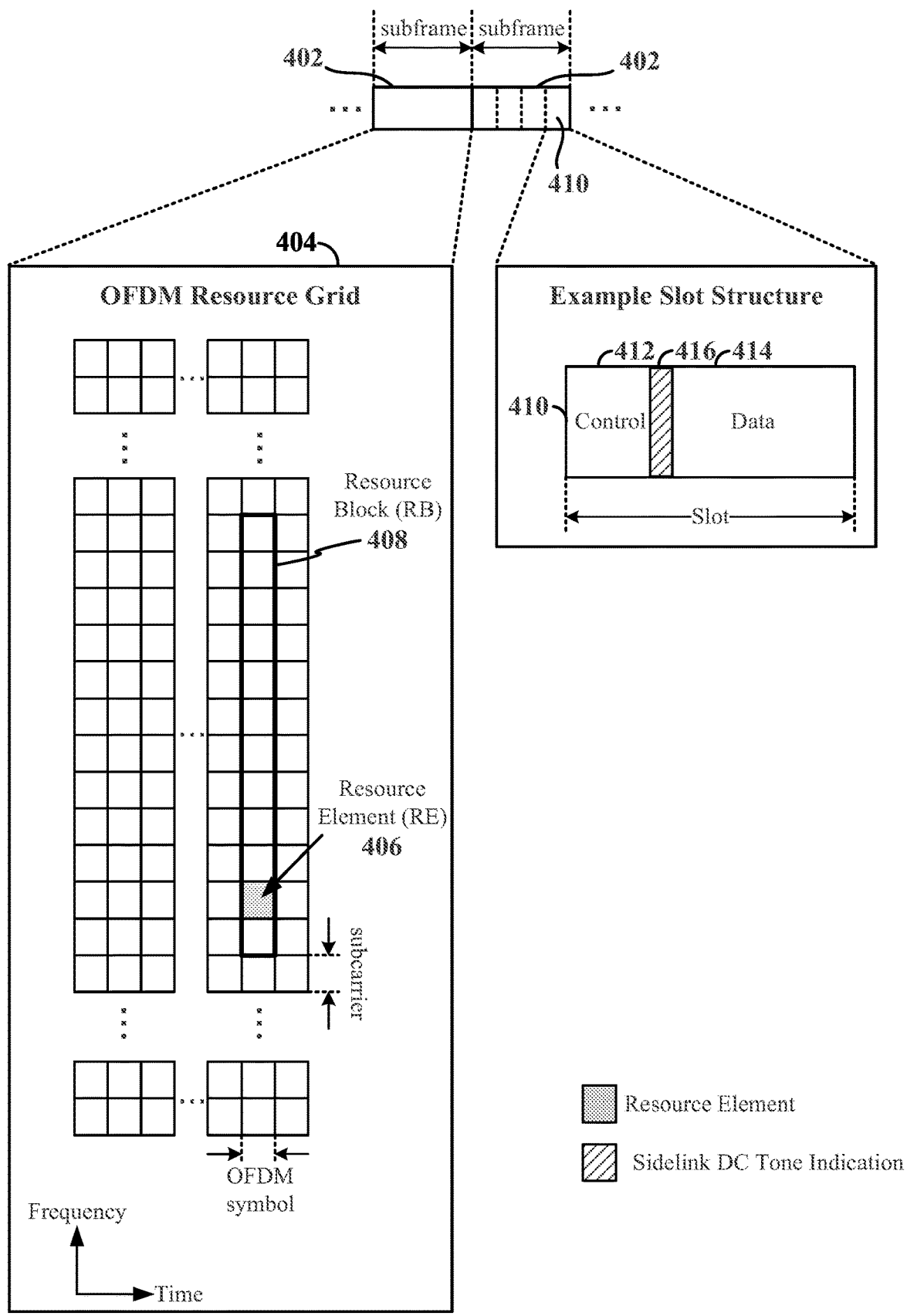
FIG. 4 is a diagram illustrating an example of a frame structure for use in a wireless communication network according to some aspects.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other intended recipient device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESETO), a cell barred indicator, a cell reselection indicator, a raster offset, and a search space for SIB 1. Examples of remaining minimum system information (RMSI) transmitted in the SIB 1 may include, but are not limited to, a random access search space, a paging search space, downlink configuration information, and uplink configuration information.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). In some examples, the SCI may include second stage SCI (e.g., SCI-2) within the data region 414 of the slot 410. The data region 414 of the slot 410 may further include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, sidelink MAC-CEs may be transmitted in the data region 414 of the slot 410. In addition, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

In some examples, a sidelink DC tone indication 416 may be transmitted in the data region 414 of the slot 410. For example, the sidelink DC tone indication 416 of a Tx UE may be included in the SCI-2. In other examples, the sidelink DC tone indication 416 of an Rx UE may be included in a sidelink MAC-CE.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

Figure 5:
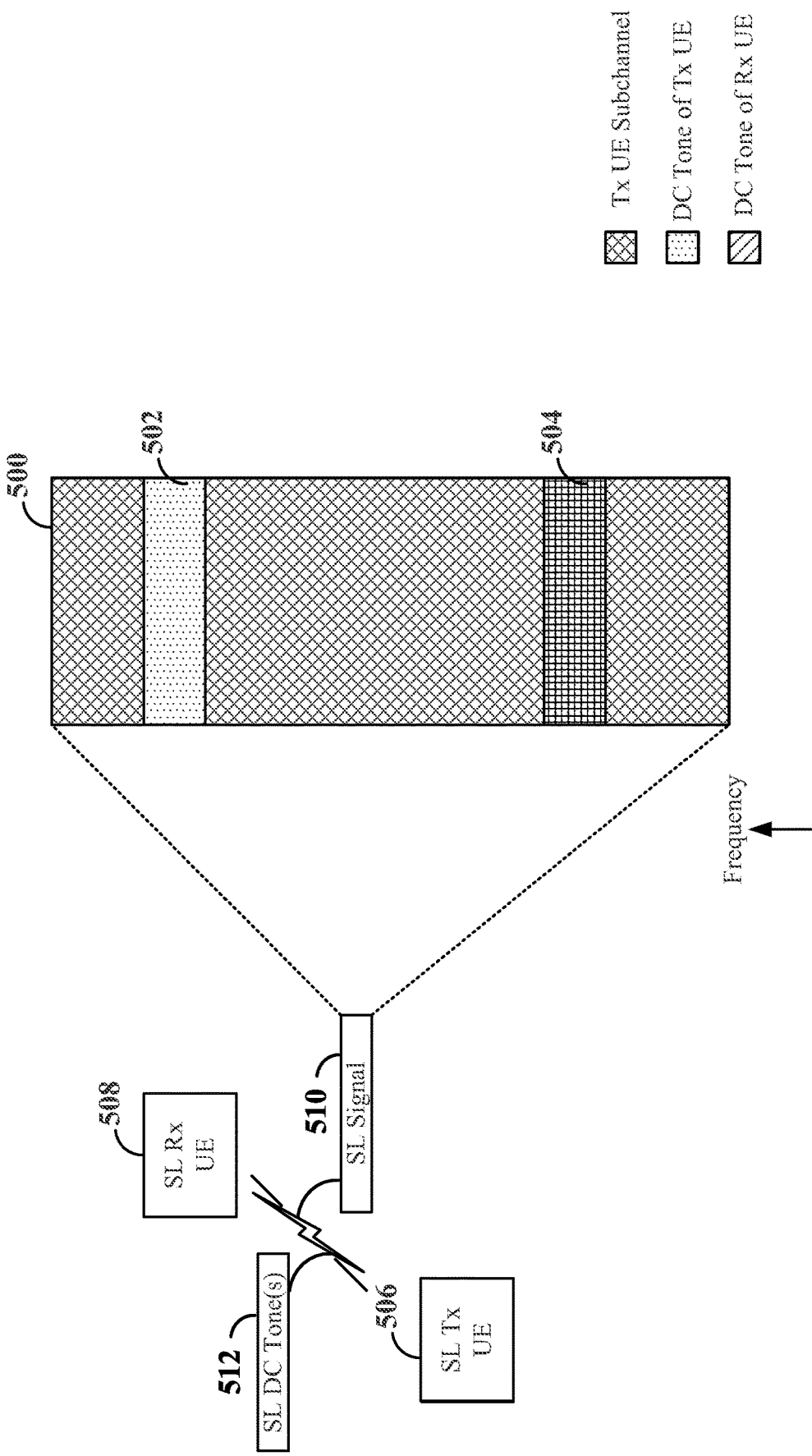
FIG. 5 is a diagram illustrating an example of direct current (DC) tone locations in a sidelink sub-channel according to some aspects.

FIG. 5 is a diagram illustrating an example of direct current (DC) tone locations in a sidelink sub-channel 500 according to some aspects. The sidelink sub-channel 500 may include, for example, 10, 15, 20, 25, 50, 75, or 100 consecutive resource blocks (e.g., RBs 408 shown in FIG. 4). The sidelink sub-channel 500 may be part of a BWP configured for sidelink communication. In addition, the sidelink sub-channel 500 may be a sub-channel on which a SL Tx UE 506 and SL Rx UE 508 communicate sidelink signals 510 over a sidelink Within the sidelink sub-channel 500, a SL DC tone 502 of the SL Tx UE 506 and a SL DC tone 504 of the SL Rx UE 508 may be located. Sidelink signals 510 transmitted from the SL Tx UE to the SL Rx UE may suffer from higher interference on the SL DC tones 502 and 504 than other locations due to DC offset. Similarly, sidelink signals 510 transmitted from the SL Rx UE 508 to the SL Tx UE 506 may also suffer from higher interference on the SL DC tones 502 and 504.

Therefore, in various aspects of the disclosure, the SL Tx UE 506 and SL Rx UE 508 may be configured to exchange indications 512 of their respective SL DC tones 502 and 504, respectively, for sidelink scheduling and transmission. For example, the SL Tx UE 506 may be configured to avoid utilizing the SL DC tones 502 and 504 in transmitting sidelink signals 510 (e.g., SL PT-RSs) to the SL Rx UE 508 within the sub-channel 500. Similarly, the SL Rx UE 508 may be configured to avoid utilizing the SL DC tones 502 and 504 in transmitting sidelink signals 510 (e.g., SL PT-RSs) to the SL Tx UE 506 within the sub-channel. In addition, with knowledge of the SL DC tone of the SL Tx UE 506, the SL Rx UE 508 may be configured to identify the SL Tx UE DC tone as a null subcarrier on the sidelink with the SL Tx UE 506 and/or to process sidelink signals 510 transmitted on sidelink resources including the SL Tx UE DC tone with consideration for the higher interference on the SL Tx UE DC tone due to the DC offset.

Figure 6:
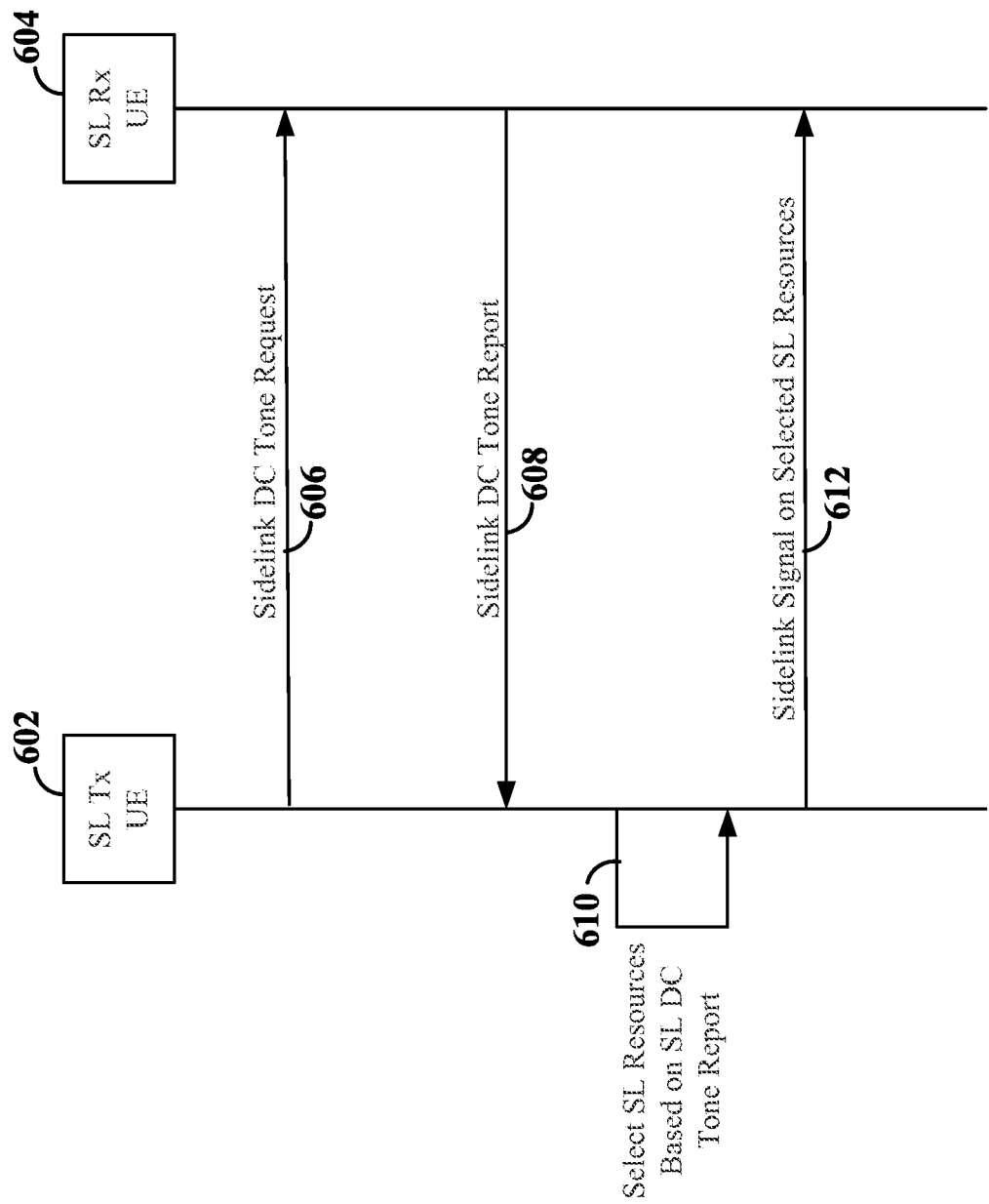
FIG. 6 is signaling diagram illustrating an example of sidelink DC tone indication according to some aspects.

FIG. 6 is signaling diagram illustrating an example of sidelink DC tone indication according to some aspects. In the example shown in FIG. 6, a transmitting sidelink wireless communication device (SL Tx UE) 602 is in wireless communication with a receiving wireless communication device (SL Rx UE) 604 over a sidelink (e.g., PC5 interface). The SL Tx UE 602 and SL Rx UE 604 may each correspond to any of the UEs or other wireless communication devices (e.g., V2X or D2D devices) shown in any of FIGS. 1-3. In the example shown in FIG. 6, the SL Tx UE 602 and SL Rx UE 604 may be configured for sidelink communication utilizing, for example, Mode 2.

At 606, the SL Tx UE 602 may generate and transmit a sidelink DC tone request to the SL Rx UE 604. The sidelink DC tone request may be, for example, a reportSLRxDirect-Current transmitted via a sidelink MAC-CE or sidelink RRC message. At 608, the SL Rx UE 604 may generate and transmit a sidelink DC tone report including an indication of the SL DC tone of the SL Rx UE 604 for the configured sidelink BWP. The sidelink DC tone report may be, for example, a SLRxDirectCurrent transmitted via a sidelink MAC-CE or a sidelink RRC message.

At 610, the SL Tx UE 602 may select (e.g., schedule) sidelink resources for the transmission of a sidelink signal based on the sidelink DC tone report. For example, the SL Tx UE 602 may select sidelink resources within a sub-channel of the configured sidelink BWP on which the SL Tx UE 602 and SL Rx UE 604 are communicating. The selected sidelink resources may exclude the SL DC tone of the SL Rx UE 604 when the SL DC tone of the Rx UE 604 is within the sub-channel. In addition, the selected sidelink resources may further exclude the SL DC tone of the Tx UE 602 when the SL DC tone of the Tx UE 602 is within the sub-channel. At 612, the SL Tx UE 602 may transmit the sidelink signal to the Rx UE 604 on the selected sidelink resources. In some examples, the sidelink signal may be a sidelink PT-RS.

Figure 7:
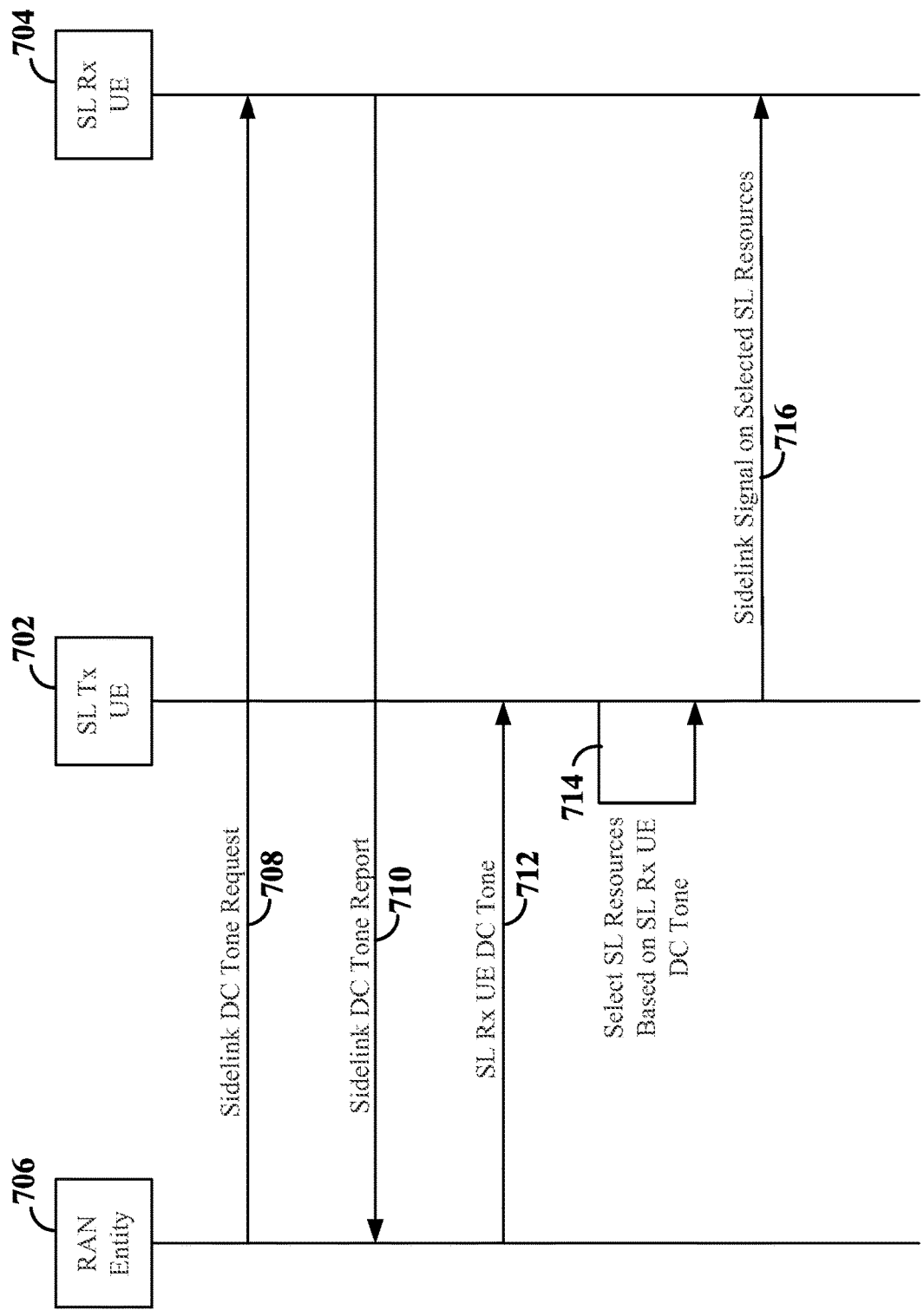
FIG. 7 is a signaling diagram illustrating another example of sidelink DC tone indication according to some aspects.

FIG. 7 is a signaling diagram illustrating another example of sidelink DC tone indication according to some aspects. In the example shown in FIG. 7, a transmitting sidelink wireless communication device (SL Tx UE) 702 is in wireless communication with a receiving wireless communication device (SL Rx UE) 704 over a sidelink (e.g., PC5 interface). The SL Tx UE 702 and SL Rx UE 704 may each correspond to any of the UEs or other wireless communication devices (e.g., V2X or D2D devices) shown in any of FIGS. 1-3. In addition, the Tx UE 702 and Rx UE 704 are further in wireless communication with a radio access network (RAN) entity 706 over respective Uu interfaces. The RAN entity 706 may correspond to any of the base stations (e.g., eNBs, gNBs, TRPs, etc.) shown in any of FIGS. 1-3. In the example shown in FIG. 7, the SL Tx UE 702 and SL Rx UE 704 may be configured for sidelink communication utilizing, for example, Mode 1.

At 708, the RAN entity 706 may optionally generate and transmit a sidelink DC tone request to the SL Rx UE 704. In some examples, the sidelink DC tone request may include an RRC setup or reconfiguration message including a CellGroupConf containing a reportUplinkTxDirectCurrent to the SL Rx UE 704 that enables reporting by the Rx UE 704 of uplink and supplementary uplink DC location information (e.g., normal uplink and supplementary uplink DC tones) upon BWP configuration and BWP reconfiguration. Here, the uplink and supplementary uplink DC location information may include one or more SL DC tones on configured sidelink BWPs.

At 710, the SL Rx UE 704 may generate and transmit a sidelink DC tone report to the RAN entity 706. In some examples, the sidelink DC tone report may include uplink and supplementary uplink DC location information. From the uplink and supplementary uplink DC location information, the RAN entity 706 may identify one or more SL DC tones within one or more corresponding configured sidelink BWPs. For example, the sidelink DC tone report may include an RRC reconfiguration complete message including an uplinkTxDirectCurrentList including a list of the SL Rx UEs 704 DC locations (e.g., uplink and/or supplementary uplink DC tones) for the configured serving cells and BWPs. The RAN entity 706 may then identify the SL DC tone(s) of the SL Rx UE 704 for the configured sidelink BWP(s) from the provided uplink DC tones.

At 712, the RAN entity 706 may then generate and transmit the SL Rx UE DC tone of a configured sidelink BWP to the SL Tx UE 702. For example, the RAN entity 706 may transmit a message containing the SL DC tone of the SL Rx UE 704 for the configured sidelink BWP to the SL Tx UE 702. In some examples, the message may include an RRC message, a MAC-CE, or DCI. In some examples, the message may further include an identifier (e.g., device ID) of the SL Rx UE 704. For example, the SL Tx UE 702 may be connected to multiple SL Rx UEs via respective sidelinks, and the SL Tx UE 702 may determine that the received SL DC tone is associated with the SL Rx UE 704 based on the device ID of the SL Rx UE 704.

At 714, the SL Tx UE 702 may select (e.g., schedule) sidelink resources for the transmission of a sidelink signal based on the SL Rx UE DC tone. For example, the SL Tx UE 702 may select sidelink resources within a sub-channel of the configured sidelink BWP on which the SL Tx UE 702 and SL Rx UE 704 are communicating. The selected sidelink resources may exclude the SL DC tone of the SL Rx UE 704 when the SL DC tone of the Rx UE 704 is within the sub-channel. In addition, the selected sidelink resources may further exclude the SL DC tone of the Tx UE 702 when the SL DC tone of the Tx UE 702 is within the sub-channel. At 716, the SL Tx UE 702 may transmit the sidelink signal to the Rx UE 704 on the selected sidelink resources. In some examples, the sidelink signal may be a sidelink PT-RS.

Although the above description is related to obtaining and providing the SL DC tone of the SL Rx UE 704 to the SL Tx UE 702 via the RAN entity 706, it should be understood the RAN entity 706 may similarly obtain and provide the SL DC tone of the SL Tx UE 702 to the SL Rx UE 704.

Figure 8:
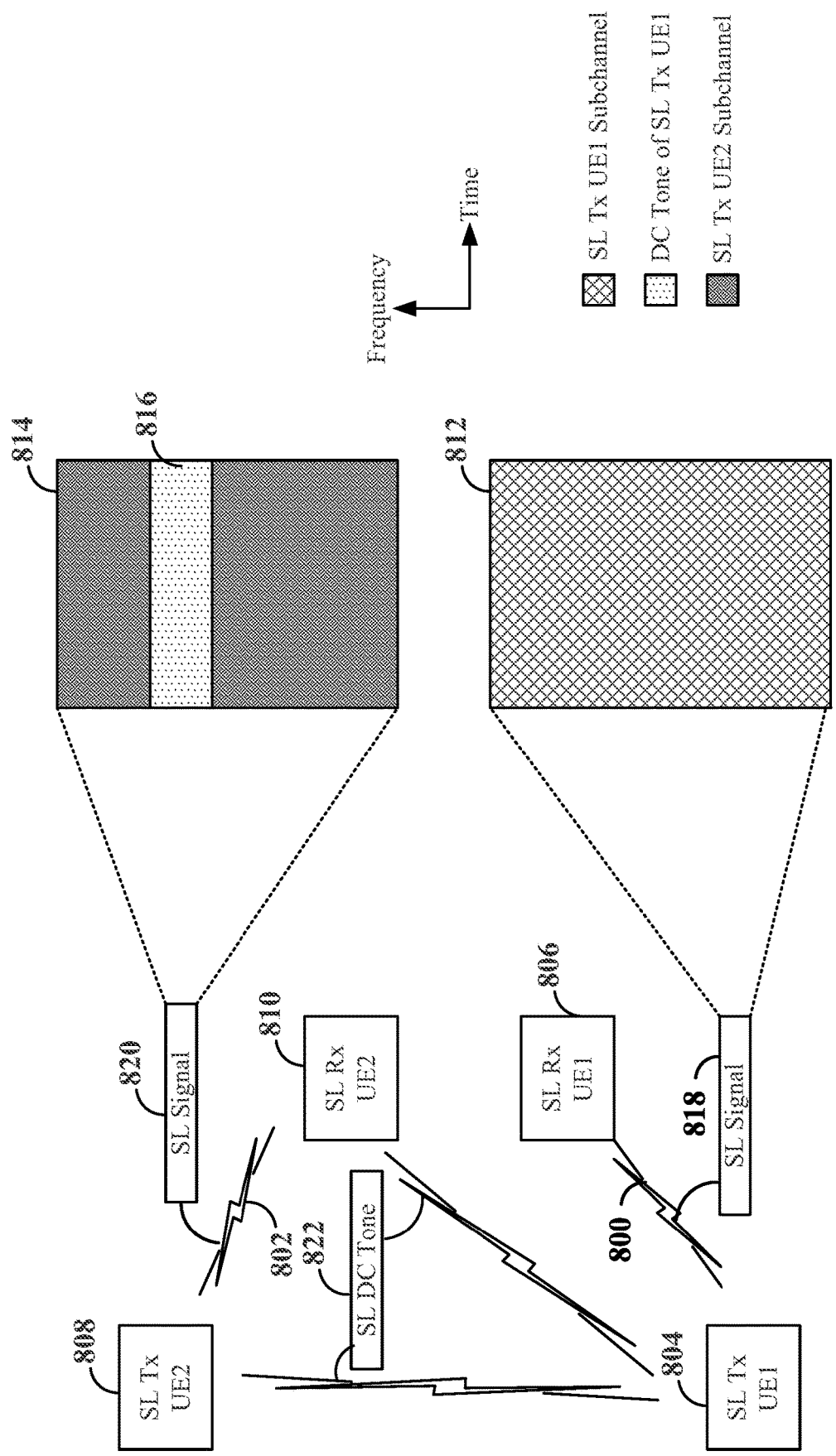
FIG. 8 is a diagram illustrating an example of DC tone locations in sidelink sub-channels across sidelinks according to some aspects.

FIG. 8 is a diagram illustrating an example of DC tone locations in sidelink sub-channels across sidelinks according to some aspects. In the example shown in FIG. 8A, two sidelinks 800 and 802 are illustrated. A first sidelink 800 is established between a first sidelink wireless communication device (SL Tx UE1) 804 and a second sidelink wireless communication device (SL Rx UE1) 806. A second sidelink 802 is established between a third sidelink wireless communication device (SL Tx UE2) 808 and a fourth sidelink wireless communication device (SL Rx UE2) 810. Each of the sidelink wireless communication devices 804, 806, 808, and 810 may correspond to any of the UEs or other wireless communication devices (e.g., V2X or D2D devices) shown in any of FIGS. 1-3.

The SL Tx UE1 804 may be configured to communicate sidelink signals 818 with the SL Rx UE1 806 on a first sub-channel 812 of a configured sidelink BWP. In addition, the SL Tx UE2 808 may be configured to communicate sidelink signals 820 with the SL Rx UE2 810 on a second sub-channel 814 of the configured sidelink BWP. In the example shown in FIG. 8, the SL DC tone 816 of the SL Tx UE1 804 may be located in the second sub-channel 814 on which the SL Tx UE2 808 and SL Rx UE2 810 communicate over sidelink 802. In examples in which the SL Tx UE1 804 transmits a first sidelink signal 818 to the SL Rx UE1 806 on first resources selected within the first sub-channel 812 and SL Tx UE2 808 transmits a second sidelink signal 820 to the SL Rx UE1 806 on second resources selected within the second sub-channel 814 that overlap in time with the first resources, interference due to LO leakage at the SL DC tone 816 of SL Tx UE1 804 may occur on the second sidelink signal when the second resources include the DC tone 816. Thus, the SL Rx UE2 810 may suffer from DC offset on the SL DC tone 816 of the SL Tx UE1.

Therefore, in various aspects of the disclosure, the SL Tx UE1 804 may be configured to provide an indication 822 of its SL DC tone 816 to the SL Tx UE2 808 and SL Rx UE2 810 for use in scheduling and transmission on sidelink 802. For example, the SL Tx UE2 808 may be configured to avoid utilizing the SL DC tone 816 in transmitting sidelink signals 820 (e.g., SL PT-RSs) to the SL Rx UE2 810 within the second sub-channel 814. Similarly, the SL Rx UE2 810 may be configured to avoid utilizing the SL DC tone 816 in transmitting sidelink signals 820 (e.g., SL PT-RSs) to the SL Tx UE2 808 within the second sub-channel 814. In addition, with knowledge of the SL DC tone 816 of the SL Tx UE1 804, the SL Rx UE2 810 may be configured to process sidelink signals 820 transmitted on sidelink resources including the SL Tx UE1 DC tone 816 with consideration for the higher interference on the SL Tx UE1 DC tone 816 due to the DC offset.

Figure 9:
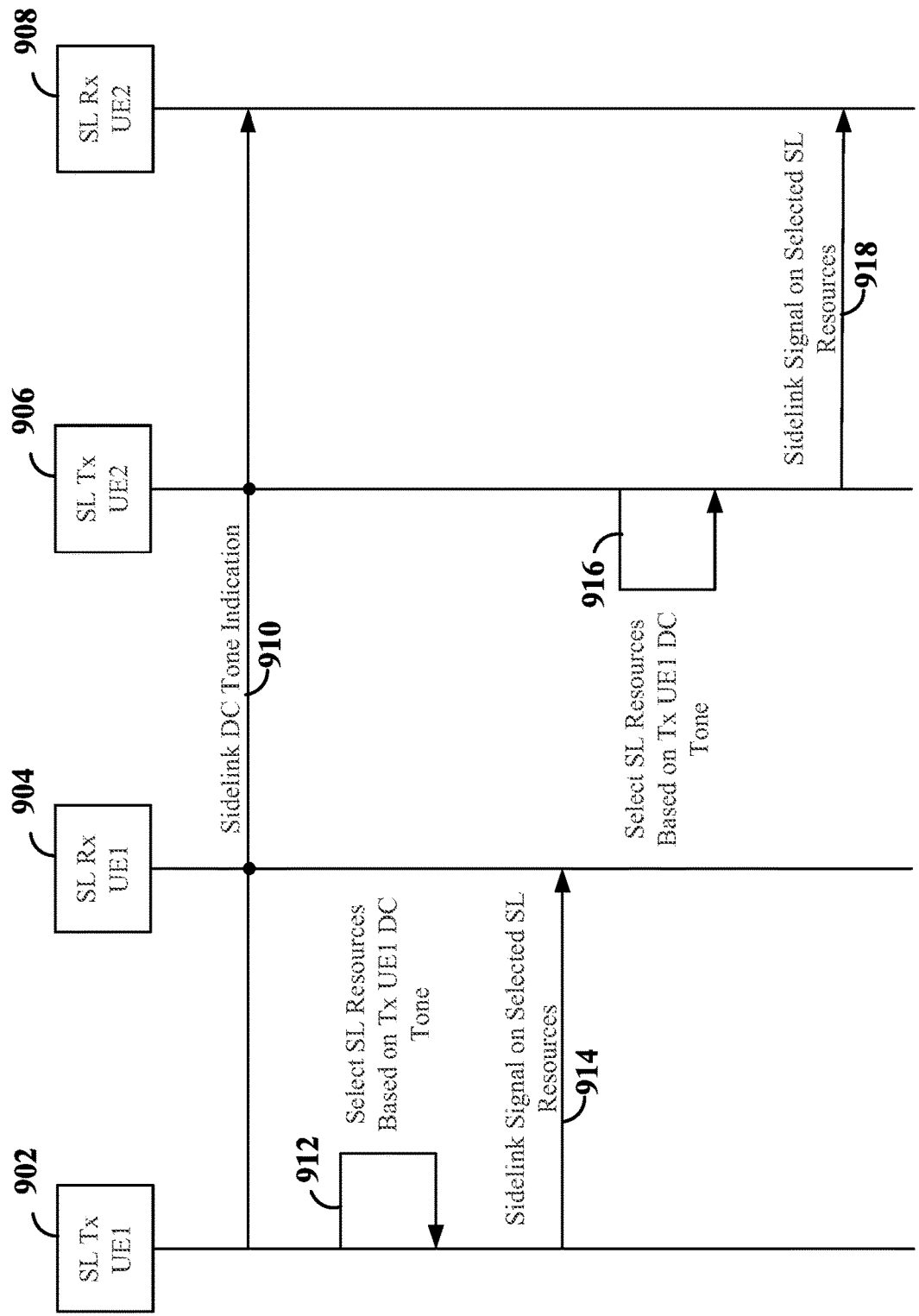
FIG. 9 is a signaling diagram illustrating another example of sidelink DC tone indication according to some aspects.

FIG. 9 is a signaling diagram illustrating another example of sidelink DC tone indication according to some aspects. In the example shown in FIG. 9, a first transmitting sidelink wireless communication device (SL Tx UE1) 902 is in wireless communication with a first receiving wireless communication device (SL Rx UE1) 904 over a first sidelink (e.g., PC5 interface). In addition, a second transmitting sidelink wireless communication device (SL Tx UE2) 906 is in wireless communication with a second receiving wireless communication device (SL Rx UE2) 908 over a second sidelink (e.g., PC5 interface). The SL Tx UE1 902 may further be in wireless communication with the SL Tx UE2 906 and the SL Rx UE2 908 over respective sidelinks Thus, the SL Tx UE2 906 and SL Rx UE2 908 may be neighbor wireless communication devices of the SL Tx UE1 902. Each of the sidelink wireless communication devices 902, 904, 906, and 908 may correspond to any of the UEs or other wireless communication devices (e.g., V2X or D2D devices) shown in any of FIGS. 1-3.

At 910, the SL Tx UE1 902 may generate and transmit a sidelink DC tone indication to SL Rx UE1 904. The sidelink DC tone indication may be transmitted, for example, via second stage sidelink control information (SCI-2) on sidelink resources selected by the SL Tx UE1 902 within a sub-channel allocated for use by the SL Tx UE1 902 in transmitting sidelink signals. In some examples, such as when the sidelink wireless communication devices 902, 904, 906, and 908 are operating in Mode 1, the sub-channel may be allocated to the SL Tx UE1 902 by a base station. In other examples, such as when the sidelink wireless communication devices 902, 904, 906, and 908 are operating in Mode 2, the sub-channel may be selected by the SL Tx UE1 (e.g., via channel sensing). Each of the SL Rx UE1, SL Tx UE2, and SL Rx UE2 may monitor the sub-channel for sidelink transmissions. Thus, the sidelink DC tone indication may be received by each of the SL Rx UE1 904, the SL Tx UE2 906, and the SL Rx UE2 908.

In some examples, the SCI-2 including the sidelink DC tone indication may be unicast to the SL Rx UE1 904. As such, the SCI-2 may include a destination identifier (ID) of the SL Rx UE1 904 indicating that the SCI-2 is intended for receipt by the SL Rx UE1 904 (e.g., the SL Rx UE1 904 is the intended recipient UE for the SCI-2). Upon receiving and decoding the destination ID in the SCI-2, each of the SL Tx UE2 906 and SL Rx UE2 908 may determine that the SCI-2 is not intended for either the SL Tx UE2 906 or the SL Rx UE2 908 (e.g., SL Tx UE2 906 and SL Rx UE2 908 are not the intended recipient UEs for the SCI-2). However, the SL Tx UE2 906 and SL Rx UE2 908 may each further be configured to decode the sidelink DC tone indication irrespective of the destination ID to identify the sidelink DC tone of the SL Tx UE1 902.

At 912, the SL Tx UE1 902 may select (e.g., schedule) sidelink resources for the transmission of a sidelink signal to the SL Rx UE1 904 based on the sidelink DC tone of the SL Tx UE1 902. For example, the SL Tx UE1 902 may exclude the SL DC tone of the SL Tx UE1 902 when the SL DC tone of the SL Tx UE1 902 is within the sub-channel allocated to (or selected by) the SL Tx UE1 902 for transmission of sidelink signals. At 914, the SL Tx UE1 902 may transmit the sidelink signal to the SL Rx UE1 904 on the selected sidelink resources. In some examples, the sidelink signal may be a sidelink PT-RS.

At 916, the SL Tx UE2 906 may further select (e.g., schedule) sidelink resources for the transmission of a sidelink signal to the SL Rx UE2 908 based on the sidelink DC tone of the SL Tx UE1 902. For example, the SL Tx UE2 906 may exclude the SL DC tone of the SL Tx UE1 902 when the SL DC tone of the SL Tx UE1 902 is within a sub-channel allocated to (or selected by) the SL Tx UE2 906 for transmission of sidelink signals. In some examples, the sub-channel allocated to the SL Tx UE2 906 may be the same as the sub-channel allocated to the SL Tx UE1 902. In other examples, SL Tx UE1 902 and SL Tx UE2 906 may utilize different sub-channels. In this example, the DC tone of the SL Tx UE1 902 may be outside the sub-channel allocated to the SL Tx UE1 902 and within the sub-channel allocated to the SL Tx UE2 906. At 914, the SL Tx UE2 906 may transmit the sidelink signal to the SL Rx UE2 908 on the selected sidelink resources. In some examples, the sidelink signal may be a sidelink PT-RS.

As indicated above, a wireless communication device (e.g., V2X or other D2D device) may schedule sidelink communication (e.g., PC5) by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the size of SCI-2 by indicating an amount of time-frequency resources that are allotted for SCI-2, a number of a PSSCH DMRS port(s), and a modulation and coding scheme (MCS) index. SCI-1 may include other information that is useful for establishing and decoding a PSSCH resource.

SCI-2 may be transmitted within the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource. In various aspects of the disclosure, the SCI-2 may further include a sidelink DC tone indication.

FIGS. 10A and 10B illustrate examples of sidelink slot structures according to some aspects. The sidelink slot structures may be utilized, for example, in a V2X or other D2D network implementing sidelink. In the examples shown in FIGS. 10A and 10B, time is in the horizontal direction with units of symbols 1002 (e.g., OFDM symbols); and frequency is in the vertical direction. Here, a carrier bandwidth 1004 allocated for sidelink communication is illustrated along the frequency axis. The carrier bandwidth 1004 may include a plurality of sub-channels, where each sub-channel may include a configurable number of PRBs (e.g., 10, 15, 20, 25, 50, 75, or 100 PRBs).

Each of FIGS. 10A and 10B illustrate an example of a slot 1000a and 1000b including fourteen symbols 1002 that may be used for sidelink communication. However, it should be understood that sidelink communication can be configured to occupy fewer than fourteen symbols in a slot 1000a and 1000b, and the disclosure is not limited to any particular number of symbols 1002. Each sidelink slot 1000a and 1000b includes a physical sidelink control channel (PSCCH) 1006 occupying a control region 1020 of the slot 1000a and 1000b and a physical sidelink shared channel (PSSCH) 1008 occupying a data region 1022 of the slot 1000a and 1000b. The PSCCH 1006 and PSSCH 1008 are each transmitted on one or more symbols 1002 of the slot 1000a. The PSCCH 1006 includes, for example, SCI-1 that schedules transmission of data traffic on time-frequency resources of the corresponding PSSCH 1008. As shown in FIGS. 10A and 10B, the PSCCH 1006 and corresponding PSSCH 1008 are transmitted in the same slot 1000a and 1000b.

In some examples, the PSCCH 1006 duration is configured to be two or three symbols. In addition, the PSCCH 1006 may be configured to span a configurable number of PRBs, limited to a single sub-channel. The PSCCH resource size may be fixed for a resource pool (e.g., 10% to 100% of one sub-channel in the first two or three symbols). For example, the PSCCH 1006 may span 10, 12, 15, 20, or 25 PRBs of a single sub-channel. A DM-RS may further be present in every PSCCH symbol. In some examples, the DM-RS may be placed on every fourth RE of the PSCCH 1006. A frequency domain orthogonal cover code (FD-OCC) may further be applied to the PSCCH DM-RS to reduce the impact of colliding PSCCH transmissions on the sidelink channel. For example, a transmitting wireless communication device may randomly select the FD-OCC from a set of pre-defined FD-OCCs. In each of the examples shown in FIGS. 10A and 10B, the starting symbol for the PSCCH 1006 is the second symbol of the corresponding slot 1000a and 1000b and the PSCCH 1006 spans three symbols 1002.

The PSSCH 1008 may be time-division multiplexed (TDMed) with the PSCCH 1006 and/or frequency-division multiplexed (FDMed) with the PSCCH 1006. In the example shown in FIG. 10A, the PSSCH 1008 includes a first portion 1008a that is TDMed with the PSCCH 1006 and a second portion 1008b that is FDMed with the PSCCH 1006.

One and two layer transmissions of the PSSCH 1008 may be supported with various modulation orders (e.g., QPSK, 16-QAM, 64-QAM and 256-QAM). In addition, the PSSCH 1008 may include DM-RSs 1014 configured in a two, three, or four symbol DM-RS pattern. For example, slot 1000a shown in FIG. 10A illustrates a two symbol DM-RS pattern, while slot 1000b shown in FIG. 10B illustrates a three symbol DM-RS pattern. In some examples, the transmitting wireless communication device can select the DM-RS pattern and indicate the selected DM-RS pattern in SCI-1, according to channel conditions. The DM-RS pattern may be selected, for example, based on the number of PSSCH 1008 symbols in the slot 1000a and 1000b. In addition, a gap symbol 1016 is present after the PSSCH 1008 in each slot 1000a and 1000b.

Each slot 1000a and 1000b further includes SCI-2 1012 mapped to contiguous RBs in the PSSCH 1008 starting from the first symbol containing a PSSCH DM-RS. In the example shown in FIG. 10A, the first symbol containing a PSSCH DM-RS is the fifth symbol occurring immediately after the last symbol carrying the PSCCH 1006. Therefore, the SCI-2 1012 is mapped to RBs within the fifth symbol. In the example shown in FIG. 10B, the first symbol containing a PSSCH DM-RS is the second symbol, which also includes the PSCCH 1006. In addition, the SCI-2/PSSCH DM-RS 1012 are shown spanning symbols two through five. As a result, the SCI-2/PSSCH DM-RS 1012 may be FDMed with the PSCCH 1006 in symbols two through four and TDMed with the PSCCH 1006 in symbol five.

The SCI-2 may be scrambled separately from the sidelink shared channel. In addition, the SCI-2 may utilize QPSK. When the PSSCH transmission spans two layers, the SCI-2 modulation symbols may be copied on both layers. The SCI-1 in the PSCCH 1006 may be blind decoded at the receiving wireless communication device. However, since the format, starting location, and number of REs of the SCI-2 1012 may be derived from the SCI-1, blind decoding of SCI-2 is not needed at the receiver (receiving wireless communication device).

In each of FIGS. 10A and 10B, the second symbol of each slot 1000a and 1000b is copied onto (repeated on) a first symbol 1010 thereof for automatic gain control (AGC) settling. For example, in FIG. 10A, the second symbol containing the PSCCH 1006 FDMed with the PSSCH 1008b may be transmitted on both the first symbol and the second symbol. In the example shown in FIG. 10B, the second symbol containing the PSCCH 1006 FDMed with the SCI-2/PSSCH DMRS 1012 may be transmitted on both the first symbol and the second symbol.

In addition, in each of FIGS. 10A and 10B, the SCI-2 1012 may include a SL DC tone indication 1024 that indicates a DC location (e.g., DC subcarrier) of a transmitting wireless communication device. In some examples, the SL DC tone indication 1024 may include two or more DC locations, each associated with a respective BWP that may be configured for sidelink communications. The SCI-2 1012 may further include a destination ID 1026 of a destination wireless communication device of the SCI-2 1012. The destination ID 1026 may be decodable by each of a plurality of wireless communication devices to determine whether the SCI-2 is intended for the wireless communication device (e.g., the wireless communication device is the intended recipient device of the SCI-2). In addition, the SL DC tone indication 1024 may further be decodable by each of the plurality of wireless communication devices to assist in scheduling and processing sidelink signals.

Figure 11:
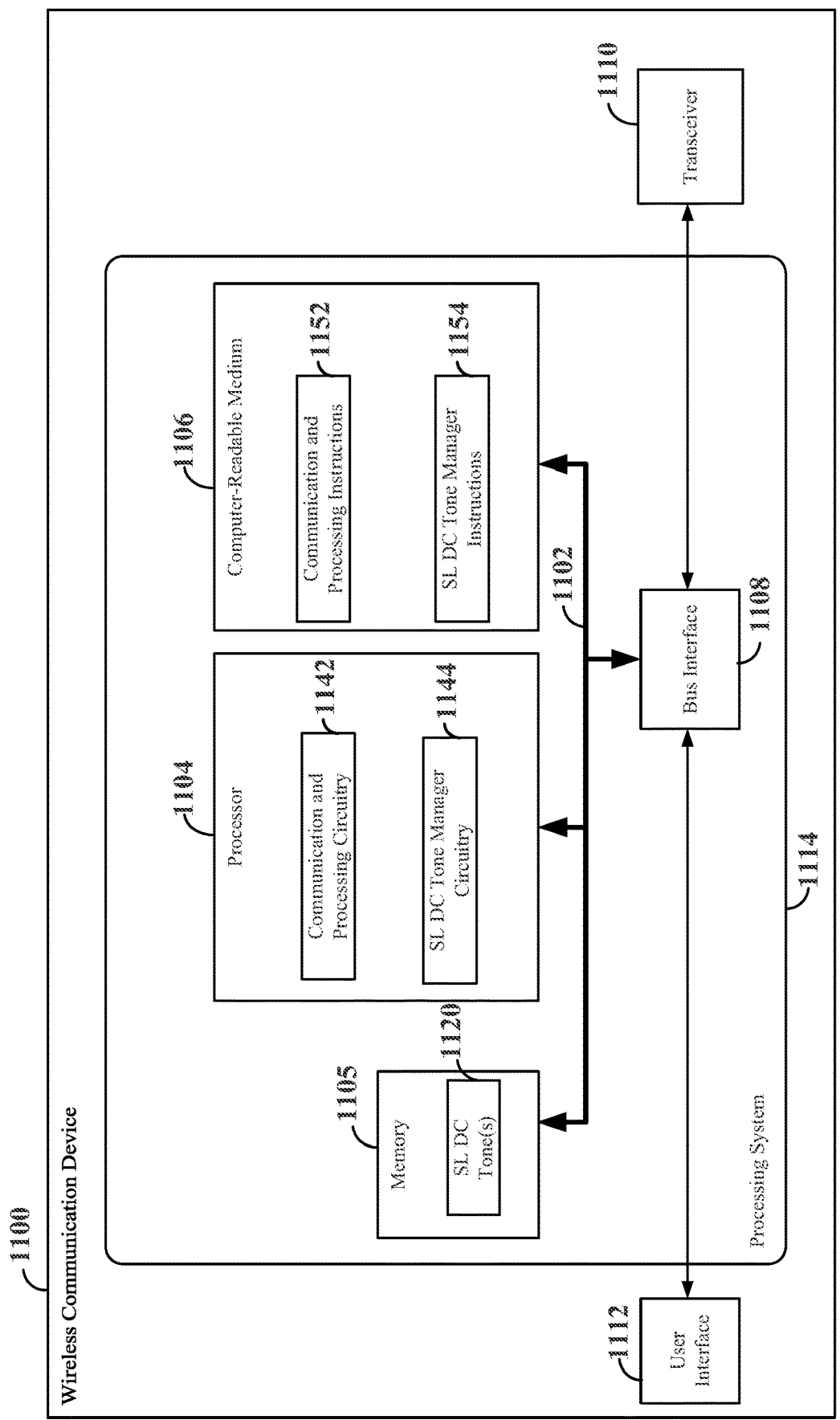
FIG. 11 is a block diagram illustrating an example of a hardware implementation for a wireless communication device employing a processing system according to some aspects.

FIG. 11 is a block diagram illustrating an example of a hardware implementation for a wireless communication device 1100 employing a processing system 1114. For example, the wireless communication device 1100 may correspond to a UE, V2X device, D2D device or other scheduled entity, as shown and described above in reference to FIGS. 1-3, 6, 7, and/or 9. In addition, the wireless communication device 1100 may correspond to a transmitting wireless communication device or a receiving wireless communication on a sidelink.

The wireless communication device 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1100 may be configured to perform any one or more of the functions described herein. That is, the processor 1104, as utilized in the wireless communication device 1100, may be used to implement any one or more of the processes and procedures described below.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further.

A bus interface 1108 provides an interface between the bus 1102 and a transceiver 1110. The transceiver 1110 provides a means for communicating with various other apparatus over a transmission medium (e.g., air interface). Depending upon the nature of the apparatus, a user interface 1112 (e.g., keypad, display, touch screen, speaker, microphone, control knobs, etc.) may also be provided. Of course, such a user interface 1112 is optional, and may be omitted in some examples.

The processor 1104 is responsible for managing the bus 1102 and general processing, including the execution of software stored on the computer-readable medium 1106. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. In some examples, the computer-readable medium 1106 may be part of the memory 1105. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include communication and processing circuitry 1142, configured to communicate with a RAN entity (e.g., a base station, such as a gNB) via a cellular (e.g., Uu) interface and one or more other wireless communication devices via a sidelink (e.g., PC5) interface. The communication and processing circuitry 1142 may further be configured to receive an allocation of one or more sub-channels from the RAN entity or to autonomously select one or more sub-channels within a configured sidelink BWP for communication on the sidelink(s) In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1142 may be configured to generate and transmit an indication of a sidelink (SL) direct current (DC) tone of the wireless communication device 1100. The communication and processing circuitry 1142 may further be configured to receive a SL DC tone of another wireless communication device. The SL DC tone(s) 1120 may be stored, for example, in memory 1105.

In examples in which the wireless communication device 1100 is a transmitting sidelink wireless communication device (SL Tx UE), the communication and processing circuitry 1142 may be configured to transmit the indication of the SL DC tone within a configured sidelink BWP of the SL Tx UE 1100 to a receiving wireless communication device (SL Rx UE). The communication and processing circuitry 1142 may further be configured to transmit the indication of the SL DC tone of the SL Tx UE 1100 to a plurality of neighbor sidelink wireless communication devices (SL neighbor UEs). The wireless communication device 1100 may be configured to transmit the SL DC tone indication within SCI-2 within a data region of a slot. The communication and processing circuitry 1142 may further be configured to transmit a request to the SL Rx UE for an indication of a SL DC tone within the configured sidelink BWP of the SL Rx UE and to receive the indication of the SL DC tone of the SL Rx UE from the SL Rx UE via, for example, SL MAC-CEs. In some examples, the communication and processing circuitry 1142 may be configured to receive a message (e.g., an RRC message, MAC-CE or DCI) from the RAN entity including the indication of the SL DC tone of the SL Rx UE. In this example, the message may further include an identifier (e.g., device ID) of the SL Rx UE. In some examples, the communication and processing circuitry 1142 may further be configured to avoid utilizing the SL DC tone of the SL Rx UE and/or the SL DC tone of the SL Tx UE 1100 in scheduling and transmitting sidelink signals to the SL Rx UE.

In examples in which the wireless communication device 1100 is a receiving sidelink wireless communication device (SL Rx UE) or a sidelink neighbor wireless communication device (SL neighbor UE), the communication and processing circuitry 1142 may be configured to receive an indication of the SL DC tone from a transmitting wireless communication device (SL Tx UE). The SL DC tone indication may be received, for example, within SCI-2 within a data region of a slot. The communication and processing circuitry 1142 may be configured to decode the SL DC tone indication in the SCI-2 irrespective of a destination ID of the SCI-2.

In examples in which the wireless communication device 1100 is a SL Rx UE, the communication and processing circuitry 1142 may further be configured to provide an indication of the SL DC tone of the SL Rx UE to the SL Tx UE. In some examples, the communication and processing circuitry 1142 may be configured to transmit the SL DC tone indication of the SL Rx UE to the RAN entity for transmission to the SL Tx UE. For example, the communication and processing circuitry 1142 may be configured to transmit the SL DC tone indication of the SL Rx UE within an uplinkTx-DirectCurrentList of an RRC reconfiguration complete message. In this example, the communication and processing circuitry 1142 may further be configured to receive an RRC message, such as an RRC setup or reconfiguration message, including a reportUplinkTxDirectCurrent requesting the SL Rx UE to provide indications of uplink DC tones, including the SL DC tone indication, to the RAN entity.

In other examples, the communication and processing circuitry 1142 may be configured to transmit the SL DC tone indication to the SL Tx UE via, for example, a SL MAC-CE or sidelink RRC message. In this example, the communication and processing circuitry 1142 may further be configured to receive a request from the SL Tx UE for the indication of the SL DC tone of the SL Rx UE via, for example, a SL MAC-CE or sidelink RRC message. In some examples, the communication and processing circuitry 1142 may further be configured to avoid utilizing the SL DC tone of the SL Tx UE and/or the SL DC tone of the SL Rx UE in scheduling and transmitting sidelink signals, such as sidelink PT-RSs, to the SL Tx UE. The communication and processing circuitry 1142 may further be configured to execute communication and processing instructions (software) 1152 stored in the computer-readable medium 1106 to implement one or more of the functions described herein.

The processor 1104 may further include SL DC tone manager circuitry 1144, configured to identify one or more SL DC tones of the wireless communication device within one or more corresponding configured sidelink BWPs and enable communication of the identified SL DC tone(s) to other wireless communication devices. The SL DC tone manager circuitry 1144 may further be configured to receive and store the SL DC tone(s) of other wireless communication device(s). The SL DC tone manager circuitry 1144 may correspond, for example, to any of the SL DC tone managers of wireless communication devices illustrated in any one or more of FIGS. 1-3.

In examples in which the wireless communication device 1100 is a transmitting wireless communication device (SL Tx UE), the SL DC tone manager circuitry 1144 may be configured to operate together with the communication and processing circuitry 1142 to generate and transmit a request for an indication of the SL DC tone of a receiving wireless communication device (SL Rx UE) in wireless communication with the SL Tx UE over a sidelink via a SL MAC-CE or SL RRC message, receive the indication of the SL DC tone of the SL Rx UE from the SL Rx UE via a SL MAC-CE or SL RRC message or from the RAN entity via a MAC-CE, DCI, or RRC message, and/or generate and transmit an indication of a SL DC tone of the SL Tx UE to the SL Rx UE and/or one or more SL neighbor UEs via SCI-2. In some examples, the SL DC tone of the SL Tx UE is within a first sub-channel on which the SL Tx UE 1100 communicates over the sidelink with the SL Rx UE. In other examples, SL DC tone of the SL Tx UE is within a second sub-channel different from the first sub-channel.

In examples in which the wireless communication device 1100 is a receiving wireless communication device (SL Rx UE), the SL DC tone manager circuitry 1144 may be configured to operate together with the communication and processing circuitry 1142 to receive the request for the indication of the SL DC tone of the SL Rx UE via a SL MAC-CE, generate and transmit the indication of the SL DC tone of the SL Rx UE to the SL Tx UE via a SL MAC-CE or to the RAN entity via an RRC message, and/or receive the indication of a SL DC tone of the SL Tx UE from the SL Tx UE via, for example, SCI-2. In addition, in examples in which the wireless communication device is a SL neighbor UE, the SL DC tone manager circuitry 1144 may further be configured to receive the indication of the SL DC tone of the SL Tx UE from the SL Tx UE via SCI-2 destined for another wireless communication device (e.g., the SL Rx UE). The SL DC tone manager circuitry 1144 may further be configured to execute SL DC tone management instructions (software) 1154 stored in the computer-readable medium 1106 to implement one or more of the functions described herein.

Figure 12:
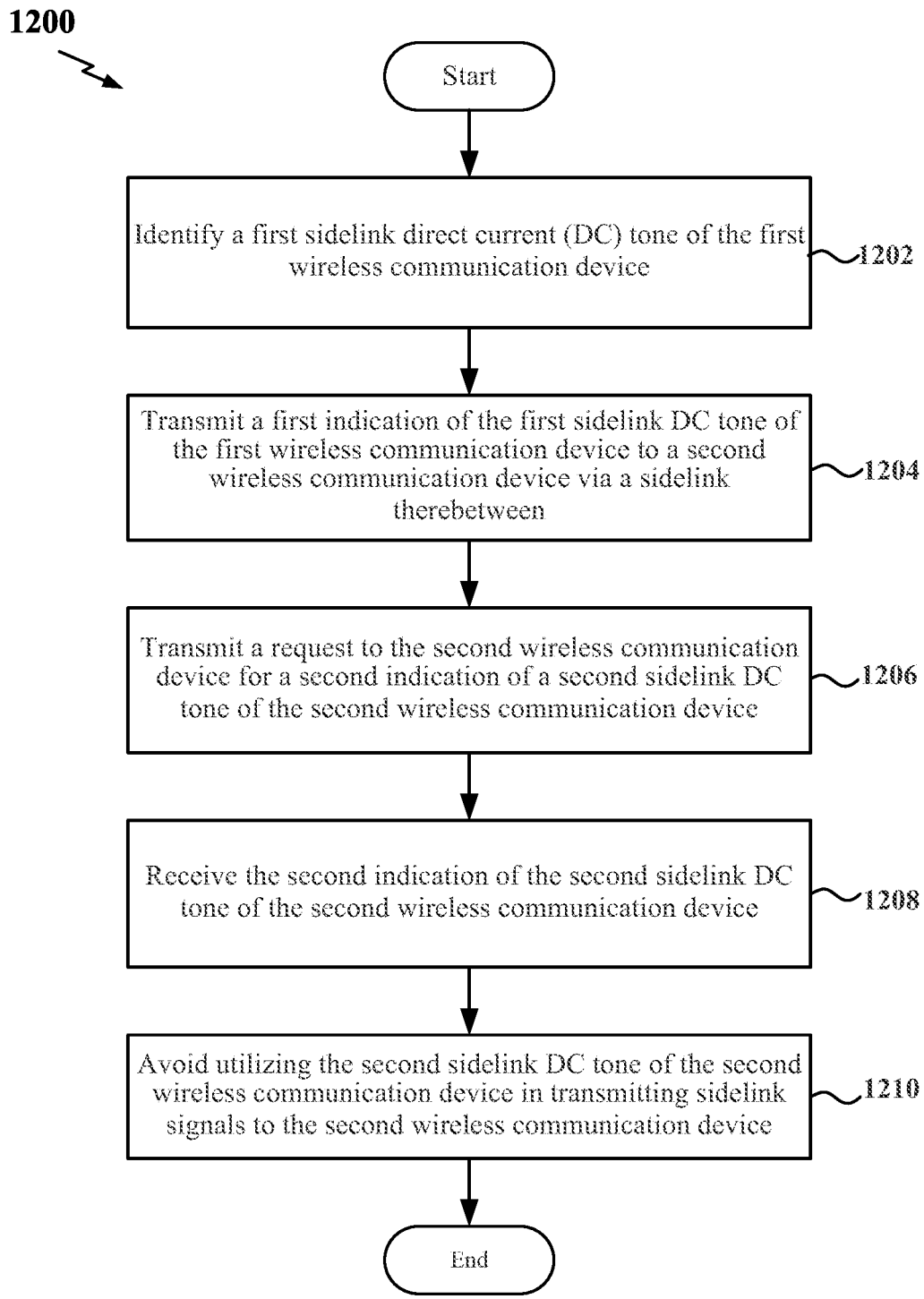
FIG. 12 is a flow chart of an exemplary method for DC tone indication in a sidelink network according to some aspects.

FIG. 12 is a flow chart of an exemplary method 1200 for DC tone indication in a sidelink network according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1202, a first wireless communication device may identify a first sidelink direct current (DC) tone of the first wireless communication device. In some examples, the first sidelink DC tone is associated with a configured sidelink BWP including a first sub-channel on which the first wireless communication device communicates over a sidelink with a second wireless communication device. In some examples, the first sidelink DC tone is within the first sub-channel. In other examples, the first sidelink DC tone is within a second sub-channel of the configured sidelink BWP different than the first sub-channel. In some examples, the first wireless communication device may identify a plurality of sidelink DC tones, each associated with a respective configured sidelink BWP. For example, the SL DC tone manager circuitry 1144 shown and described above in connection with FIG. 11 may provide a means to identify the first sidelink DC tone.

At block 1204, the first wireless communication device may transmit a first indication of the first sidelink DC tone of the first wireless communication device to the second wireless communication device via the sidelink therebetween. In some examples, the first wireless communication device may transmit the first indication of the first sidelink DC tone of the first wireless communication device to the second wireless communication device within stage two sidelink control information (SCI-2) in a data region of a slot. In some examples, the first wireless communication device may further transmit the first indication of the first sidelink DC tone of the first wireless communication device to a plurality of neighbor wireless communication devices. For example, the SCI-2 including the first indication of the first sidelink DC tone may be decodable by the plurality of neighbor wireless communication devices irrespective of the destination ID of the SCI-2 (e.g., the destination ID of the SCI-2 may be the destination ID of the second wireless communication device). For example, the SL DC tone manager circuitry 1144, together with the communication and processing circuitry 1142 and transceiver 1110, shown and described above in connection with FIG. 11 may provide a means to transmit the first indication of the first sidelink DC tone to the second wireless communication device.

At block 1206, the first wireless communication device may optionally transmit a request to the second wireless communication device for a second indication of a second sidelink DC tone of the second wireless communication device. In some examples, the request may be a reportSLRxDirectCurrent included in a sidelink MAC-CE transmitted to the second wireless communication device. For example, the SL DC tone manager circuitry 1144, together with the communication and processing circuitry 1142 and transceiver 1110, shown and described above in connection with FIG. 11, may provide a means to optionally transmit the request for the second indication of the second sidelink DC tone to the second wireless communication device.

At block 1208, the first wireless communication device may receive the second indication of the second sidelink DC tone of the second wireless communication device. In some examples, the first wireless communication device may be configured to receive a sidelink MAC-CE including the second indication of the second sidelink DC tone of the second wireless communication device from the second wireless communication device via the sidelink. For example, the second indication of the second sidelink DC tone may be included in a SLRxDirectCurrent of the sidelink MAC-CE.

In some examples, the first wireless communication device may receive a radio resource control (RRC) message including the second indication of the second sidelink DC tone of the second wireless communication device from a radio access network (RAN) entity (e.g., a base station) in wireless communication with the first wireless communication device and the second wireless communication device. In some examples, the RRC message may further include an identifier (e.g., a device ID) of the second wireless communication device. For example, the SL DC tone manager circuitry 1144, together with the communication and processing circuitry 1142 and transceiver 1110, shown and described above in connection with FIG. 11 may provide a means to receive the second indication of the second sidelink DC tone of the second wireless communication device.

At block 1210, the first wireless communication device may optionally avoid utilizing the second sidelink DC tone of the second wireless communication device in transmitting sidelink signals to the second wireless communication device. In addition, the first wireless communication device may further avoid utilizing the first sidelink DC tone of the first wireless communication device in scheduling and transmitting sidelink signals to the second wireless communication device. In some examples, the sidelink signals include sidelink PT-RSs. For example, the communication and processing circuitry 1142 shown and described above in connection with FIG. 11, may provide a means to avoid utilizing the second sidelink DC tone of the second wireless communication device in transmitting sidelink signals to the second wireless communication device.

Figure 13:
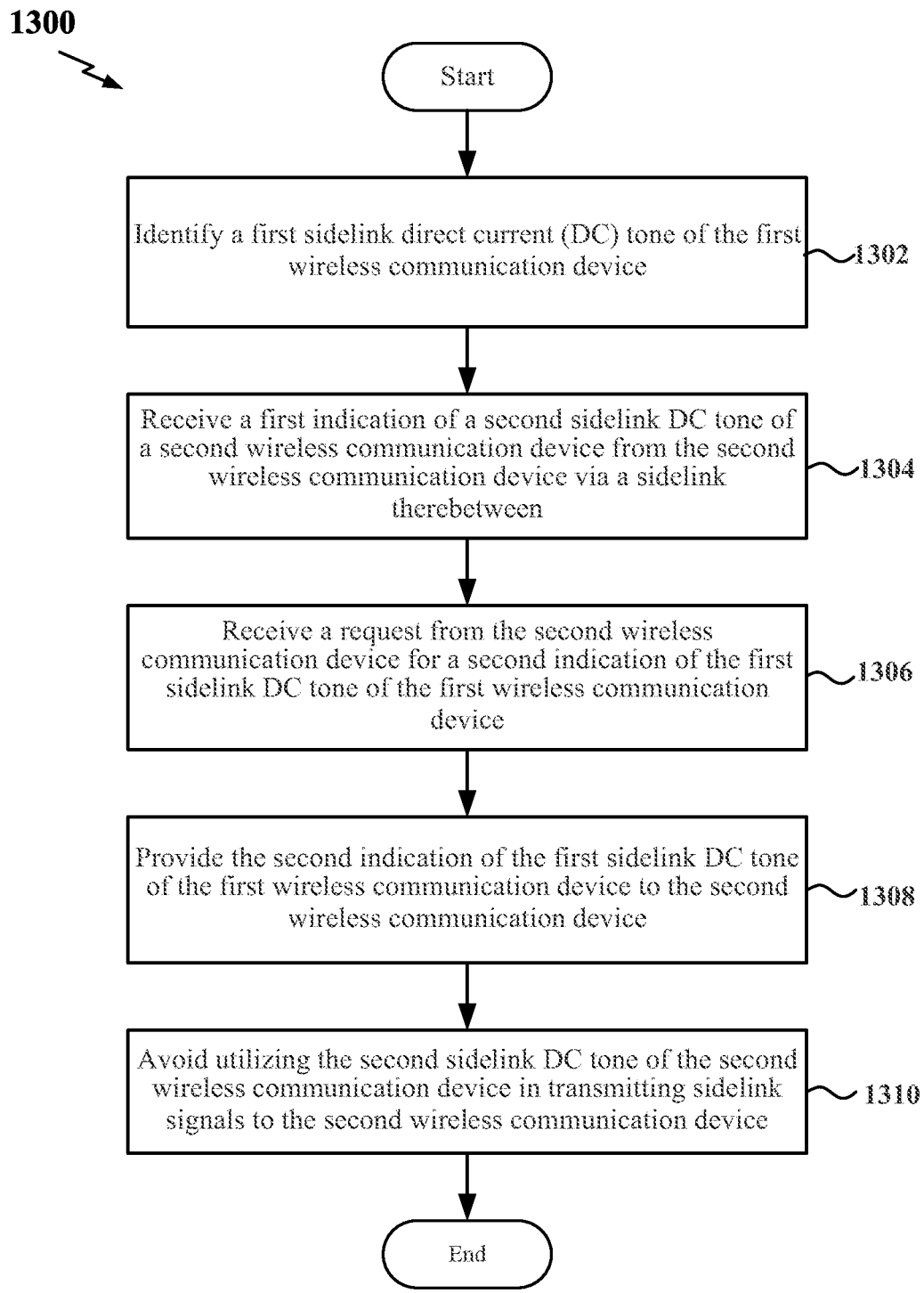
FIG. 13 is a flow chart of another exemplary method for DC tone indication in a sidelink network according to some aspects.

FIG. 13 is a flow chart of another exemplary method 1300 for DC tone indication in a sidelink network according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1302, a first wireless communication device may identify a first sidelink direct current (DC) tone of the first wireless communication device. In some examples, the first sidelink DC tone is associated with a configured sidelink BWP. In some examples, the first wireless communication device may identify a plurality of sidelink DC tones, each associated with a respective configured sidelink BWP. For example, the SL DC tone manager circuitry 1144 shown and described above in connection with FIG. 11 may provide a means to identify the first sidelink DC tone.

At block 1304, the first wireless communication device may receive a first indication of a second sidelink DC tone of a second wireless communication device from the second wireless communication device via a sidelink therebetween. In some examples, the second sidelink DC tone is within a first sub-channel of the configured sidelink BWP on which the second wireless communication device communicates with the first wireless communication device. In other examples, the second sidelink DC tone is within a second sub-channel of the configured sidelink BWP different than the first sub-channel. In some examples, the first wireless communication device may receive the first indication of the second sidelink DC tone of the second wireless communication device from the second wireless communication device within stage two sidelink control information (SCI-2) in a data region of a slot. In some examples, the second wireless communication device may decode the first indication of the second sidelink DC tone in the SCI-2 irrespective of the destination ID of the SCI-2. For example, the SL DC tone manager circuitry 1144, together with the communication and processing circuitry 1142 and transceiver 1110, shown and described above in connection with FIG. 11 may provide a means to receive the first indication of the second sidelink DC tone of the second wireless communication device.

At block 1306, the first wireless communication device may optionally receive a request from the second wireless communication device for a second indication of the first sidelink DC tone of the first wireless communication device. In some examples, the request may be a reportSLRxDirectCurrent included in a sidelink MAC-CE received from the second wireless communication device. For example, the SL DC tone manager circuitry 1144, together with the communication and processing circuitry 1142 and transceiver 1110, shown and described above in connection with FIG. 11, may provide a means to optionally receive the request for the second indication of the first sidelink DC tone from the second wireless communication device.

At block 1308, the first wireless communication device may provide the second indication of the first sidelink DC tone of the first wireless communication device to the second wireless communication device. In some examples, the first wireless communication device may be configured to transmit a sidelink MAC-CE including the second indication of the first sidelink DC tone of the first wireless communication device to the second wireless communication device via the sidelink. For example, the second indication of the first sidelink DC tone may be included in a SLRxDirectCurrent of the sidelink MAC-CE.

In some examples, the first wireless communication device may be configured to transmit the second indication of the first sidelink DC tone of the first wireless communication device to a radio access network (RAN) entity (e.g., a base station) in wireless communication with the first wireless communication device and the second wireless communication device for transmission of the second indication of the first sidelink DC tone of the first wireless communication device to the second wireless communication device. For example, the first wireless communication device may be configured to transmit a radio resource control (RRC) message, such as an RRC reconfiguration complete message or other RRC message, including the second indication of the first sidelink DC tone. For example, the SL DC tone manager circuitry 1144, together with the communication and processing circuitry 1142 and transceiver 1110, shown and described above in connection with FIG. 11 may provide a means to provide the second indication of the first sidelink DC tone of the first wireless communication device to the second wireless communication device.

At block 1310, the first wireless communication device may optionally avoid utilizing the second sidelink DC tone of the second wireless communication device in transmitting sidelink signals to the second wireless communication device. In addition, the first wireless communication device may further avoid utilizing the first sidelink DC tone of the first wireless communication device in scheduling and transmitting sidelink signals to the second wireless communication device. In some examples, the sidelink signals include sidelink PT-RSs. Furthermore, the first wireless communication device may avoid utilizing the second sidelink DC tone of the second wireless communication device in transmitting sidelink signals to other neighbor wireless communication devices. For example, the communication and processing circuitry 1142 shown and described above in connection with FIG. 11, may provide a means to avoid utilizing the second sidelink DC tone of the second wireless communication device in transmitting sidelink signals to the second wireless communication device.

In one configuration, the wireless communication device 1100 includes means for exchanging DC tone indications with other wireless communication devices in a sidelink network as described in the present disclosure. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1-3, 6, 7, and/or 9, and utilizing, for example, the processes and/or algorithms described herein in relation to FIGS. 12 and 13.

Figure 14:
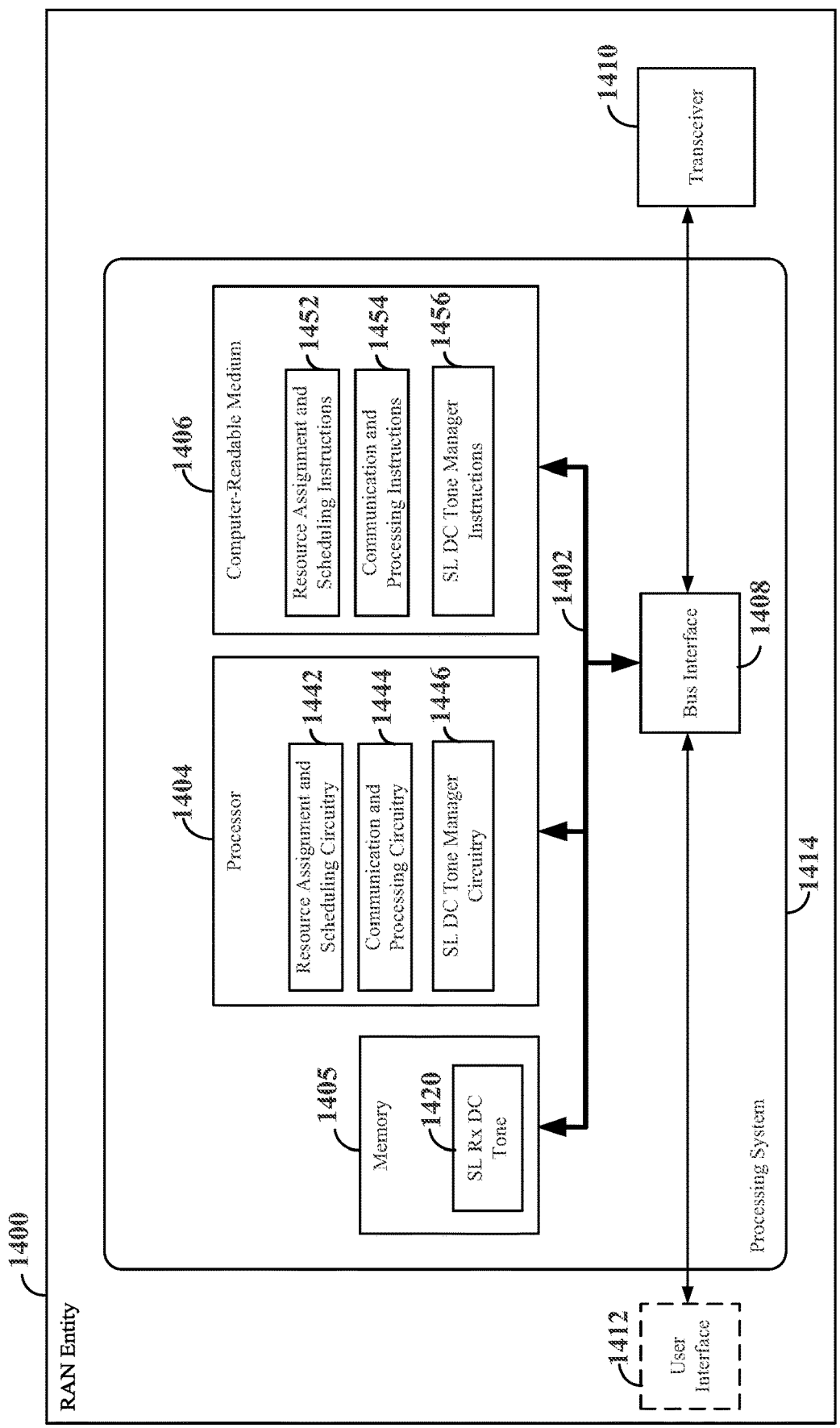
FIG. 14 is a block diagram illustrating an example of a hardware implementation for a radio access network (RAN) entity employing a processing system according to some aspects.

FIG. 14 is a conceptual diagram illustrating an example of a hardware implementation for an exemplary radio access network (RAN) entity 1400 employing a processing system 1414. For example, the RAN entity 1400 may correspond to any of the base stations (e.g., gNBs) or other scheduling entities illustrated in any one or more of FIGS. 1-3 and/or 7.

In accordance with various aspects of the disclosure, an element, or any portion of an element, or any combination of elements may be implemented with a processing system 1414 that includes one or more processors 1404. The processing system 1414 may be substantially the same as the processing system 1114 illustrated in FIG. 11, including a bus interface 1408, a bus 1402, memory 1405, a processor 1404, and a computer-readable medium 1406. Furthermore, the RAN entity 1400 may include an optional user interface 1412 and a transceiver 1410 substantially similar to those described above in FIG. 11. The processor 1404, as utilized in a RAN entity 1400, may be used to implement any one or more of the processes described below.

In some aspects of the disclosure, the processor 1404 may include circuitry configured for various functions. For example, the processor 1404 may include resource assignment and scheduling circuitry 1442, configured to generate, schedule, and modify a resource assignment or grant of time-frequency resources (e.g., a set of one or more resource elements). For example, the resource assignment and scheduling circuitry 1442 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1442 may be configured to schedule resources for sidelink communication between wireless communication devices. In some examples, the resource assignment and scheduling circuitry 1442 may schedule transmission or reception resource pools within one or more bandwidth parts (BWPs) for sidelink communication. In addition, the resource assignment and scheduling circuitry 1442 may be configured to allocate one or more sub-channels within the configured sidelink BWP(s) for sidelink communication between a transmitting wireless communication device and a receiving wireless communication device communicating over a sidelink therebetween. For example, the minimum resource allocation unit in frequency may be a single sub-channel (e.g., which may include, for example, 10, 15, 20, 25, 50, 75, or 100 consecutive resource blocks) and the minimum resource allocation unit in time may be one slot. The resource assignment and scheduling circuitry 1442 may further be configured to schedule transmission of radio resource control (RRC) messages including the sidelink resource pools and/or sidelink resource allocation(s) to the wireless communication devices.

The resource assignment and scheduling circuitry 1442 may further be configured to schedule the transmission of an indication of a sidelink (SL) DC tone of the receiving wireless communication to the RAN entity 1400. For example, the resource assignment and scheduling circuitry 1442 may be configured to schedule resources for the transmission of an RRC message including the indication of the SL DC tone from the receiving wireless communication device. For example, the RRC message may include an uplinkTxDirectCurrentList from the receiving wireless communication device that includes the indication of the SL DC tone.

The resource assignment and scheduling circuitry 1442 may further be configured to schedule resources for the transmission of the indication of the SL DC tone of the receiving wireless communication device to the transmitting wireless communication device. For example, the resource assignment and scheduling circuitry 1442 may be configured to schedule resources for the transmission of an RRC message to the transmitting wireless communication device including the indication of the SL DC tone of the receiving wireless communication device. The resource assignment and scheduling circuitry 1442 may further be configured to execute resource assignment and scheduling instructions (software) 1452 stored in the computer-readable medium 1406 to implement one or more of the functions described herein.

The processor 1404 may further include communication and processing circuitry 1444, configured to communicate with the transmitting and receiving wireless communication devices. For example, the transmitting and receiving wireless communication devices may communicate using a Mode 1 sidelink configuration in which resources for sidelink communication may be scheduled by the resource assignment and scheduling circuitry 1442.

In some examples, the communication and processing circuitry 1444 may include one or more hardware components that provide the physical structure that performs processes related to wireless communication (e.g., signal reception and/or signal transmission) and signal processing (e.g., processing a received signal and/or processing a signal for transmission).

The communication and processing circuitry 1444 may further be configured to receive a message (e.g., an RRC reconfiguration complete message) including the indication of the SL DC tone of the receiving wireless communication device from the receiving wireless communication device. In addition, the communication and processing circuitry 1444 may further be configured to transmit a message (e.g., an RRC message, a MAC-CE, or DCI) including the indication of the SL DC tone of the receiving wireless communication device to the transmitting wireless communication device. In some examples, the RRC message further includes an identifier (e.g., a device ID) of the receiving wireless communication device. In some examples, the communication and processing circuitry 1444 may further be configured to receive a message (e.g., an RRC reconfiguration complete message) including the indication of the SL DC tone of the transmitting wireless communication device and transmit a message (e.g., an RRC message, a MAC-CE, or DCI) including the indication of the SL DC tone of the transmitting wireless communication device to one or more receiving wireless communication devices. The communication and processing circuitry 1444 may further be configured to execute communication and processing instructions (software) 1454 stored in the computer-readable medium 1406 to implement one or more of the functions described herein.

The processor 1404 may further include sidelink (SL) DC tone manager circuitry 1446, configured to manage the transmission of the SL DC tone of the receiving wireless communication device to the transmitting wireless communication device (and vice-versa). The SL DC tone manager circuitry 1446 may correspond, for example, to any of the SL DC managers of RAN entities shown in any one or more of FIGS. 1-3.

The SL DC tone manager circuitry 1446 may be configured to generate a sidelink DC tone request for transmission to the receiving wireless communication device and/or the transmitting wireless communication device via the communication and processing circuitry 1444 and transceiver 1410. The sidelink DC tone request may include, for example, an RRC setup or reconfiguration message including a report UplinkTxDirectCurrent requesting uplink and/or supplementary uplink DC location information including the SL DC tone of the receiving wireless communication device and/or transmitting wireless communication device. The SL DC tone manager circuitry 1446 may further be configured to receive a sidelink DC tone report from the receiving wireless communication device and/or transmitting wireless communication device (e.g., via the communication and processing circuitry 1444 and transceiver 1410). The sidelink DC tone report includes the SL DC tone of the receiving wireless communication device or transmitting wireless communication device. The sidelink DC tone report may include, for example, an RRC reconfiguration complete message including an uplinkTxDirectCurrentList including the SL DC tone of the receiving wireless communication device or transmitting wireless communication device.

Figure 15:
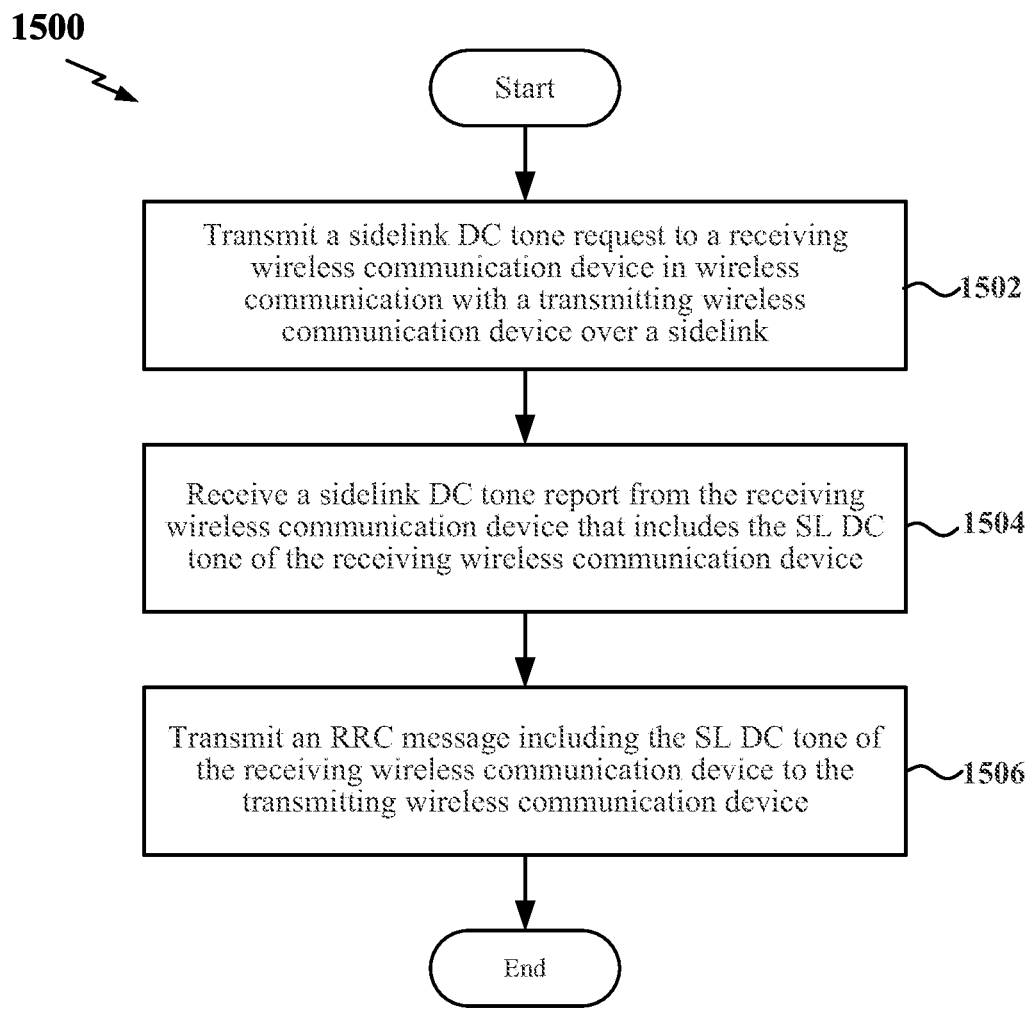
FIG. 15 is a flow chart of another exemplary method for sidelink DC tone indication according to some aspects.

The SL DC tone manager circuitry 1446 may further be configured to generate an RRC message including the SL DC tone of the receiving wireless communication device for transmission to the transmitting wireless communication device via the communication and processing circuitry 1444 and transceiver 1410. The SL DC tone manager circuitry 1446 may further be configured to generate an RRC message including the SL DC tone of the transmitting wireless communication device for transmission to the receiving wireless communication device via the communication and processing circuitry 1444 and transceiver 1410. The SL DC tone manager circuitry 1446 may further be configured to execute SL DC tone manager instructions (software) 1456 stored in the computer-readable medium 1406 to implement one or more of the functions described herein FIG. 15 is a flow chart of another exemplary method 1500 for sidelink DC tone indication in a sidelink network according to some aspects. As described below, some or all illustrated features may be omitted in a particular implementation within the scope of the present disclosure, and some illustrated features may not be required for implementation of all examples. In some examples, the method may be performed by the RAN entity 1400, as described above and illustrated in FIG. 14, by a processor or processing system, or by any suitable means for carrying out the described functions.

At block 1502, the RAN entity may transmit a sidelink DC tone request to a receiving wireless communication device in wireless communication with a transmitting wireless communication device over a sidelink. The sidelink DC tone request may include, for example, an RRC setup or reconfiguration message including a report UplinkTxDirectCurrent requesting uplink and/or supplementary uplink DC location information including the SL DC tone of the receiving wireless communication device. For example, the SL DC tone manager circuitry 1446, together with the communication and processing circuitry 1444 and transceiver 1410, shown and described above in connection with FIG. 14 may provide a means for transmitting the sidelink DC tone request.

At block 1504, the RAN entity may receive a sidelink DC tone report from the receiving wireless communication device that includes the SL DC tone of the receiving wireless communication device. The sidelink DC tone report may include, for example, an RRC reconfiguration complete message including an uplinkTxDirectCurrentList including the SL DC tone of the receiving wireless communication device. For example, the SL DC tone manager circuitry 1446, together with the communication and processing circuitry 1444 and transceiver 1410, shown and described above in connection with FIG. 14 may provide a means for receiving the sidelink DC tone report At block 1506, the RAN entity may transmit an RRC message including the SL DC tone of the receiving wireless communication device to the transmitting wireless communication device. In some examples, the RRC message further includes an identifier (e.g., a device ID) of the receiving wireless communication device. For example, the SL DC tone manager circuitry 1446, together with the communication and processing circuitry 1444 and transceiver 1410 may provide a means to transmit the RRC message to the transmitting wireless communication device.

In one configuration, the RAN entity 1400 includes means for exchanging sidelink DC tones between wireless communication devices in a sidelink network as described in the present disclosure. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1-3 and/or 7, and utilizing, for example, the processes and/or algorithms described herein in relation to FIG. 15.

Figure 16:
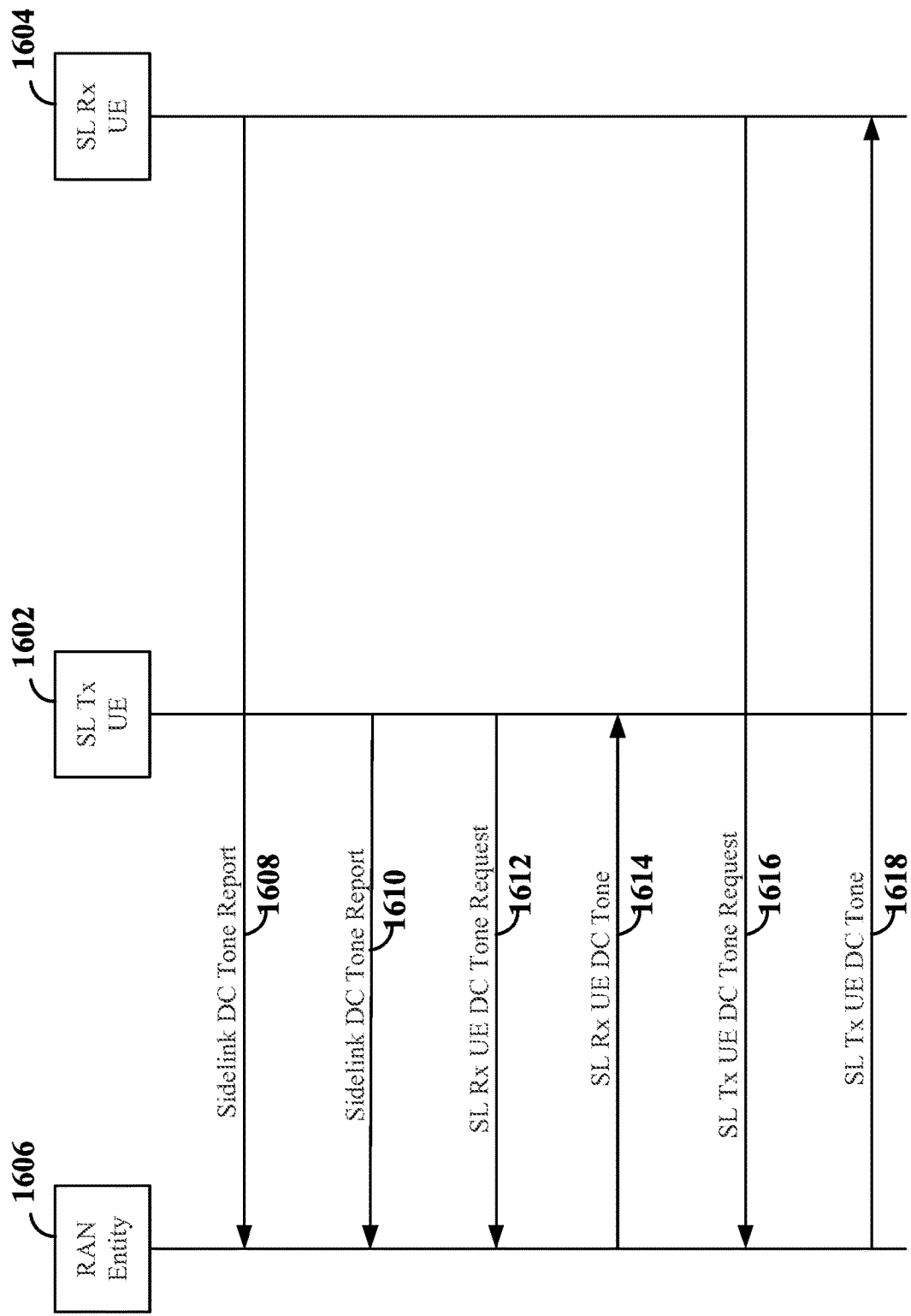
FIG. 16 is a signaling diagram illustrating another example of sidelink DC tone indication according to some aspects.

FIG. 16 is a signaling diagram illustrating another example of sidelink DC tone indication according to some aspects. In the example shown in FIG. 16, a transmitting sidelink wireless communication device (SL Tx UE) 1602 is in wireless communication with a receiving wireless communication device (SL Rx UE) 1604 over a sidelink (e.g., PC5 interface). The SL Tx UE 1602 and SL Rx UE 1604 may each correspond to any of the UEs or other wireless communication devices (e.g., V2X or D2D devices) shown in any of FIGS. 1-3. In addition, the SL Tx UE 1602 and SL Rx UE 1604 are further in wireless communication with a radio access network (RAN) entity 1606 over respective Uu interfaces. The RAN entity 1606 may correspond to any of the base stations (e.g., eNBs, gNBs, TRPs, etc.) shown in any of FIGS. 1-3. In the example shown in FIG. 16, the SL Tx UE 1602 and SL Rx UE 1604 may be configured for sidelink communication utilizing, for example, Mode 1.

At 1608, the SL Rx UE 1604 may generate and transmit a sidelink DC tone report to the RAN entity 1606. In some examples, the SL Rx UE 1604 may transmit the sidelink DC tone report in response to sidelink DC tone request from the RAN entity 1606. In some examples, the sidelink DC tone report may include uplink and supplementary uplink DC location information. From the uplink and supplementary uplink DC location information, the RAN entity 1606 may identify one or more SL DC tones within one or more corresponding configured sidelink BWPs. For example, the sidelink DC tone report may include an RRC reconfiguration complete message including an uplinkTxDirectCurrentList including a list of the SL Rx UEs 1604 DC locations (e.g., uplink and/or supplementary uplink DC tones) for the configured serving cells and BWPs. The RAN entity 1606 may then identify the SL DC tone(s) of the SL Rx UE 1604 for the configured sidelink BWP(s) from the provided uplink DC tones.

At 1610, the SL Tx UE 1602 may also generate and transmit a sidelink DC tone report to the RAN entity 1606. In some examples, the SL Tx UE 1602 may transmit the sidelink DC tone report in response to sidelink DC tone request from the RAN entity 1606. In some examples, the sidelink DC tone report may include uplink and supplementary uplink DC location information. From the uplink and supplementary uplink DC location information, the RAN entity 1606 may identify one or more SL DC tones within one or more corresponding configured sidelink BWPs. For example, the sidelink DC tone report may include an RRC reconfiguration complete message including an uplinkTxDirectCurrentList including a list of the SLTRx UEs 1602 DC locations (e.g., uplink and/or supplementary uplink DC tones) for the configured serving cells and BWPs. The RAN entity 1606 may then identify the SL DC tone(s) of the SL Tx UE 1602 for the configured sidelink BWP(s) from the provided uplink DC tones.

At 1612, the RAN entity 1606 may receive a SL Rx UE DC tone request from the SL Tx UE 1602. In some examples, the SL Rx UE DC tone request may indicate a configured sidelink BWP for the sidelink between the SL Tx UE 1602 and the SL Rx UE 1604. In addition, the SL Rx UE DC tone request may include an identifier (e.g., device ID) of the SL Rx UE 1604. For example, the SL Tx UE 1602 may transmit the SL Rx UE DC tone request to the RAN entity 1606 within a MAC-CE or UCI.

At 1614, the RAN entity 1606 may then generate and transmit the SL Rx UE DC tone of the configured sidelink BWP to the SL Tx UE 1602. For example, the RAN entity 1606 may transmit the SL DC tone of the SL Rx UE 1604 for the configured sidelink BWP to the SL Tx UE 1602 within an RRC message, a MAC-CE, or DCI. In some examples, the RRC message may further include an identifier (e.g., device ID) of the SL Rx UE 1604.

At 1616, the RAN entity 1606 may receive a SL Tx UE DC tone request from the SL Rx UE 1604. In some examples, the SL Tx UE DC tone request may indicate a configured sidelink BWP for the sidelink between the SL Tx UE 1602 and the SL Rx UE 1604. In addition, the SL Tx UE DC tone request may include an identifier (e.g., device ID) of the SL Tx UE 1602. For example, the SL Rx UE 1604 may transmit the SL Tx UE DC tone request to the RAN entity 1606 within a MAC-CE or UCI.

At 1618, the RAN entity 1606 may then generate and transmit the SL Tx UE DC tone of the configured sidelink BWP to the SL Rx UE 1604. For example, the RAN entity 1606 may transmit the SL DC tone of the SL Tx UE 1602 for the configured sidelink BWP to the SL Rx UE 1604 within an RRC message, a MAC-CE, or DCI. In some examples, the RRC message may further include an identifier (e.g., device ID) of the SL Tx UE 1602.

Figure 17:
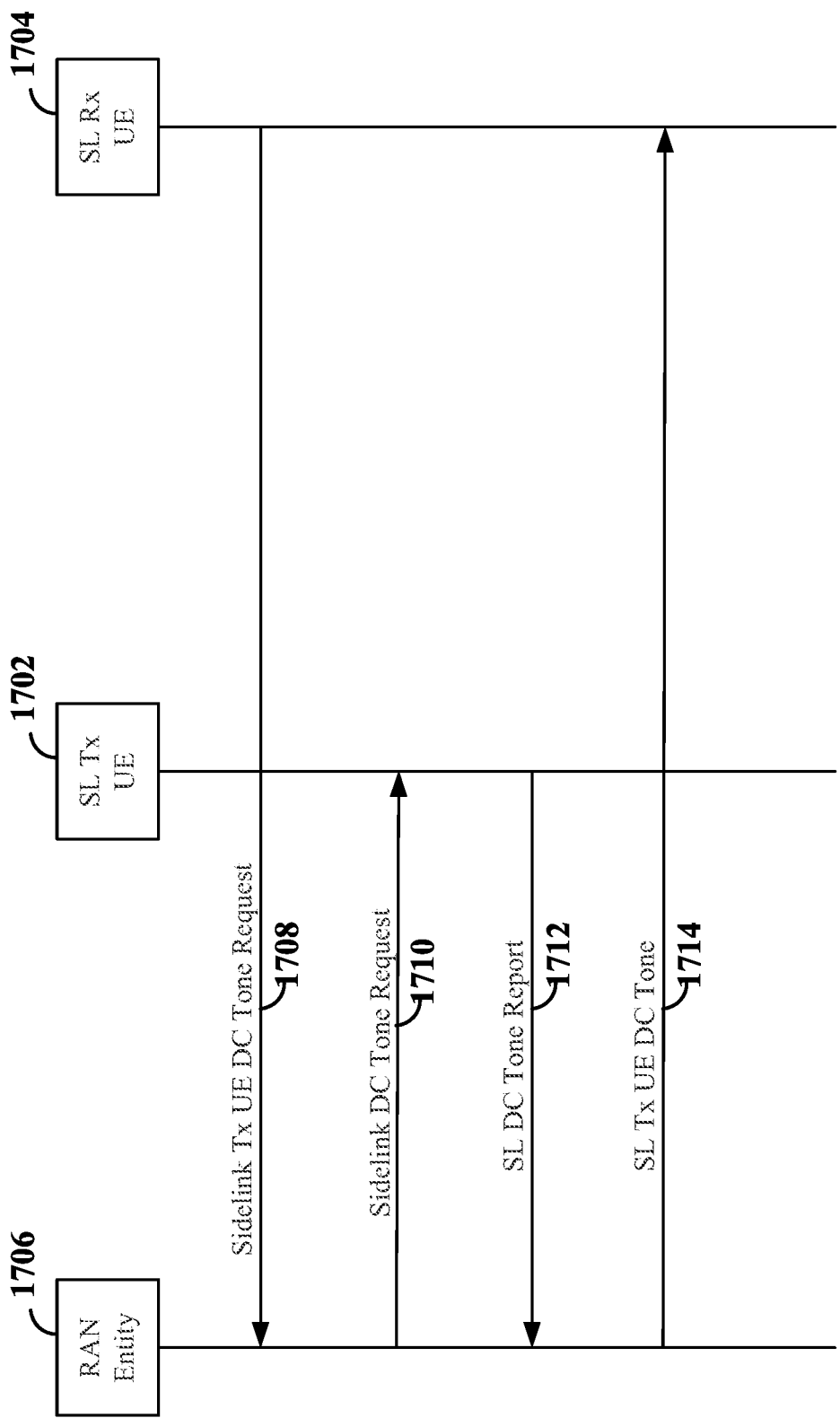
FIG. 17 is a signaling diagram illustrating another example of sidelink DC tone indication according to some aspects.

FIG. 17 is a signaling diagram illustrating another example of sidelink DC tone indication according to some aspects. In the example shown in FIG. 17, a transmitting sidelink wireless communication device (SL Tx UE) 1702 is in wireless communication with a receiving wireless communication device (SL Rx UE) 1704 over a sidelink (e.g., PC5 interface). The SL Tx UE 1702 and SL Rx UE 1704 may each correspond to any of the UEs or other wireless communication devices (e.g., V2X or D2D devices) shown in any of FIGS. 1-3. In addition, the SL Tx UE 1702 and SL Rx UE 1704 are further in wireless communication with a radio access network (RAN) entity 1706 over respective Uu interfaces. The RAN entity 1706 may correspond to any of the base stations (e.g., eNBs, gNBs, TRPs, etc.) shown in any of FIGS. 1-3. In the example shown in FIG. 17, the SL Tx UE 1702 and SL Rx UE 1704 may be configured for sidelink communication utilizing, for example, Mode 1.

At 1708, the SL Rx UE 1704 may generate and transmit a SL Tx UE DC tone request. In some examples, the SL Rx UE DC tone request may indicate a configured sidelink BWP for the sidelink between the SL Tx UE 1702 and the SL Rx UE 1704. In addition, the SL Tx UE DC tone request may include an identifier (e.g., device ID) of the SL Tx UE 1702. For example, the SL Rx UE 1704 may transmit the SL Tx UE DC tone request to the RAN entity 1706 within a MAC-CE or UCI.

At 1710, the RAN entity 1706 may generate and transmit a sidelink DC tone request to the SL Tx UE 1702. In some examples, the sidelink DC tone request may include an RRC setup or reconfiguration message including a CellGroupConf containing a report UplinkTxDirectCurrent to the SL Tx UE 1702 that enables reporting by the Tx UE 1702 of uplink and supplementary uplink DC location information (e.g., normal uplink and supplementary uplink DC tones) upon BWP configuration and BWP reconfiguration. Here, the uplink and supplementary uplink DC location information may include one or more SL DC tones on configured sidelink BWPs.

At 1712, the SL Tx UE 1702 may generate and transmit a sidelink DC tone report to the RAN entity 1706. In some examples, the sidelink DC tone report may include uplink and supplementary uplink DC location information. From the uplink and supplementary uplink DC location information, the RAN entity 1706 may identify one or more SL DC tones within one or more corresponding configured sidelink BWPs. For example, the sidelink DC tone report may include an RRC reconfiguration complete message including an uplinkTxDirectCurrentList including a list of the SL Tx UEs 1702 DC locations (e.g., uplink and/or supplementary uplink DC tones) for the configured serving cells and BWPs. The RAN entity 1706 may then identify the SL DC tone(s) of the SL Tx UE 1702 for the configured sidelink BWP(s) from the provided uplink DC tones.

At 1714, the RAN entity 1706 may then generate and transmit the SL Tx UE DC tone of the configured sidelink BWP to the SL Rx UE 1704. For example, the RAN entity 1706 may transmit the SL DC tone of the SL Tx UE 1702 for the configured sidelink BWP to the SL Rx UE 1704 within an RRC message, a MAC-CE, or DCI. In some examples, the RRC message may further include an identifier (e.g., device ID) of the SL Tx UE 1702.

Although the above description is related to obtaining and providing the SL DC tone of the SL Tx UE 1702 to the SL Rx UE 1704 via the RAN entity 1706, it should be understood the RAN entity 1706 may similarly obtain and provide the SL DC tone of the SL Rx UE 1704 to the SL Tx UE 1702.

Figure 18:
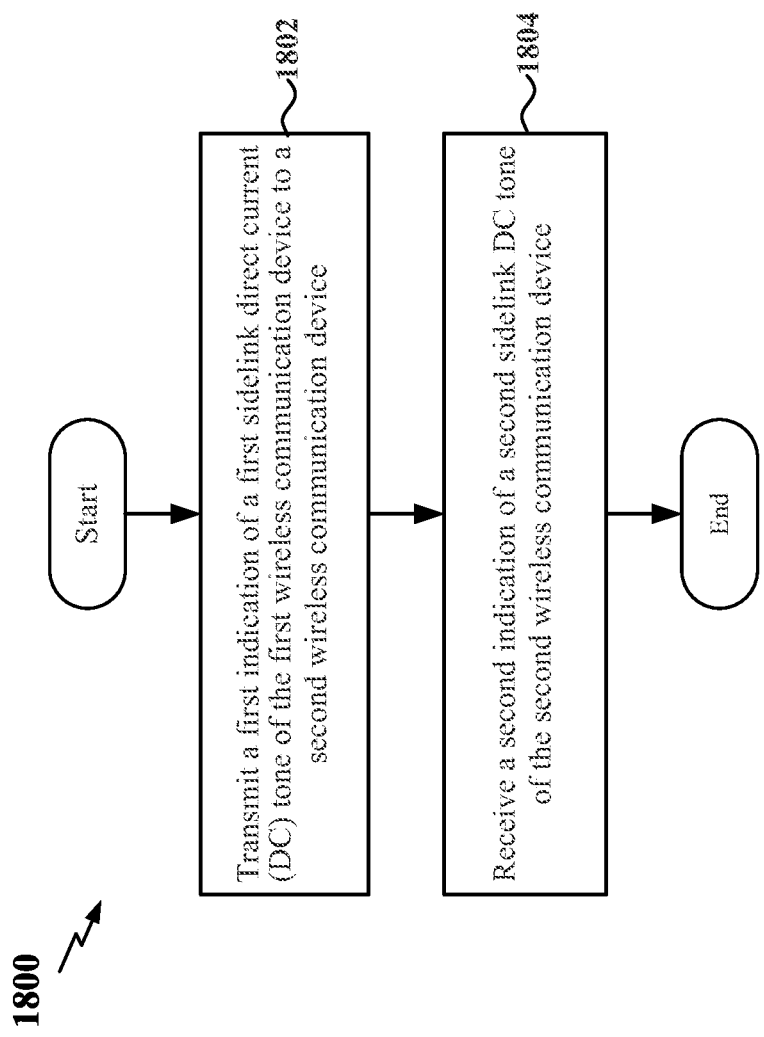
FIG. 18 is a flow chart of another exemplary method for sidelink DC tone indication according to some aspects.

FIG. 18 is a flow chart of another exemplary method 1800 for sidelink DC tone indication according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1802, a first wireless communication device may transmit a first indication of a first sidelink direct current (DC) tone of the first wireless communication device to a second wireless communication device. In some examples, the first wireless communication device may transmit the first indication of the first sidelink DC tone of the first wireless communication device to the second wireless communication device via a sidelink between the first wireless communication device and the second wireless communication device. In some examples, the first wireless communication device may transmit the first indication of the first sidelink DC tone of the first wireless communication device to the second wireless communication device within stage two sidelink control information (SCI) in a data region of a slot.

In some examples, the first wireless communication device may transmit the first indication of the first sidelink DC tone of the first wireless communication device to a plurality of neighbor wireless communication devices. In some examples, the first sidelink DC tone may be within a first sub-channel on which the first wireless communication device communicates over the sidelink with the second wireless communication device. In other examples, the first sidelink DC tone is within a second sub-channel different from a first sub-channel on which the first wireless communication device communicates over the sidelink with the second wireless communication device. For example, the SL DC tone manager circuitry 1144, together with the communication and processing circuitry 1142 and transceiver 1110, shown and described above in connection with FIG. 11 may provide a means to transmit the first indication of the first sidelink DC tone to the second wireless communication device.

At block 1804, the first wireless communication device may receive a second indication of a second sidelink DC tone of the second wireless communication device. In some examples, the first wireless communication device may receive a sidelink medium access control-control element (MAC-CE) or a sidelink radio resource control (RRC) message including the second indication of the second sidelink DC tone of the second wireless communication device from the second wireless communication device. In some examples, the first wireless communication device may transmit a request to the second wireless communication device for the second indication of the second sidelink DC tone.

In some examples, the first wireless communication device may receive a message including the second indication of the second sidelink DC tone of the second wireless communication device from a base station in wireless communication with the first wireless communication device and the second wireless communication device. The message may include a radio resource control (RRC) message, a medium access control (MAC) control element (MAC-CE), or downlink control information (DCI). In some examples, the message further includes an identifier of the second wireless communication device.

In some examples, the first wireless communication device may further avoid utilizing the second sidelink DC tone of the second wireless communication device in transmitting sidelink signals to the second wireless communication device. For example, the SL DC tone manager circuitry 1144, together with the communication and processing circuitry 1142 and transceiver 1110, shown and described above in connection with FIG. 11 may provide a means to receive the second indication of the second sidelink DC tone of the second wireless communication device.

Figure 19:
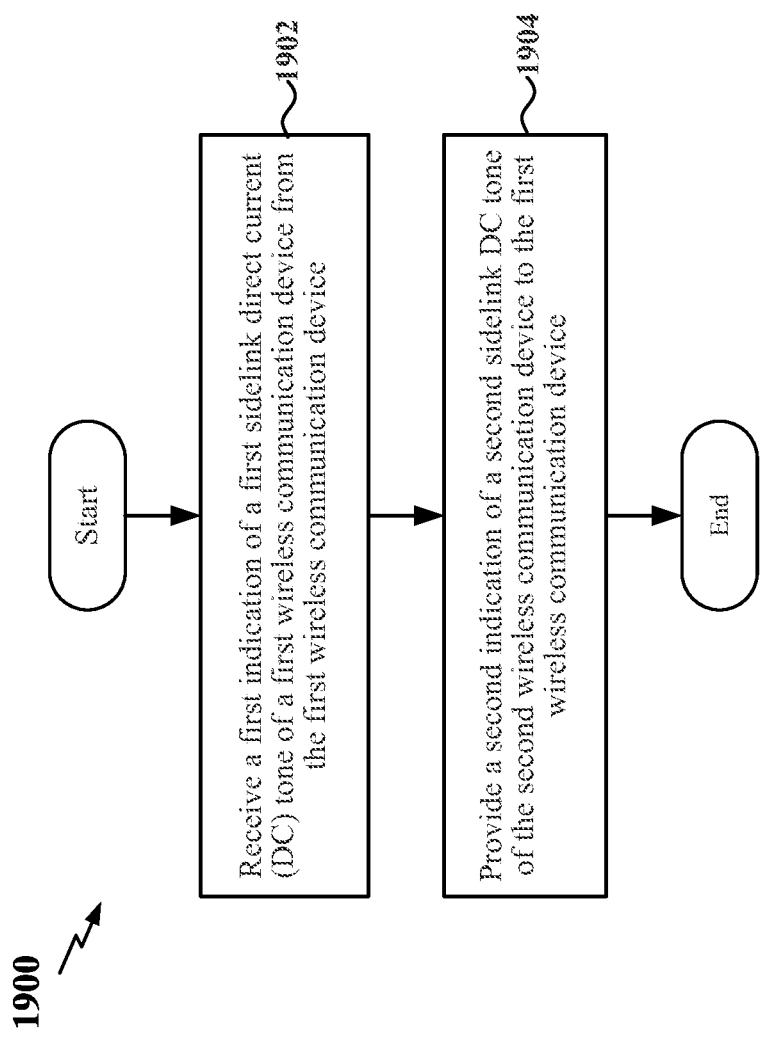
FIG. 19 is a flow chart of another exemplary method for sidelink DC tone indication according to some aspects.

FIG. 19 is a flow chart of another exemplary method 1900 for sidelink DC tone indication according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1902, a second wireless communication device may receive a first indication of a first sidelink direct current (DC) tone of a first wireless communication device from the first wireless communication device. In some examples, the second wireless communication device may receive the first indication of the first sidelink DC tone of the first wireless communication device from the first wireless communication device via a sidelink between the first wireless communication device and the second wireless communication device. In some examples, the second wireless communication device may receive the first indication of the first sidelink DC tone of the first wireless communication device from the first wireless communication device within stage two sidelink control information (SCI) in a data region of a slot.

In some examples, the first sidelink DC tone is within a first sub-channel on which the first wireless communication device communicates over a sidelink with the second wireless communication device. In some examples, the first sidelink DC tone is within a second sub-channel different from a first sub-channel on which the first wireless communication device communicates over a sidelink with the second wireless communication device. For example, the SL DC tone manager circuitry 1144, together with the communication and processing circuitry 1142 and transceiver 1110, shown and described above in connection with FIG. 11 may provide a means to receive the first indication of the first sidelink DC tone of the first wireless communication device.

At block 1904, the second wireless communication device may provide a second indication of a second sidelink DC tone of the second wireless communication device to the first wireless communication device. In some examples, the second wireless communication device may transmit a sidelink medium access control-control element (MAC-CE) or sidelink radio resource control (RRC) message including the second indication of the second sidelink DC tone of the second wireless communication device to the first wireless communication device via the sidelink. In some examples, the second wireless communication device may receive a request from the first wireless communication device for the second indication of the second sidelink DC tone.

In some examples, the second wireless communication device may transmit the second indication of the second sidelink DC tone of the second wireless communication device to a base station in wireless communication with the first wireless communication device and the second wireless communication device for transmission of the second indication of the second sidelink DC tone of the second wireless communication device to the first wireless communication device. In some examples, the second wireless communication device may avoid utilizing the first sidelink DC tone of the first wireless communication device in transmitting sidelink signals to the first wireless communication device. For example, the SL DC tone manager circuitry 1144, together with the communication and processing circuitry 1142 and transceiver 1110, shown and described above in connection with FIG. 11 may provide a means to transmit the second indication of the second sidelink DC tone to the first wireless communication device.

Figure 20:
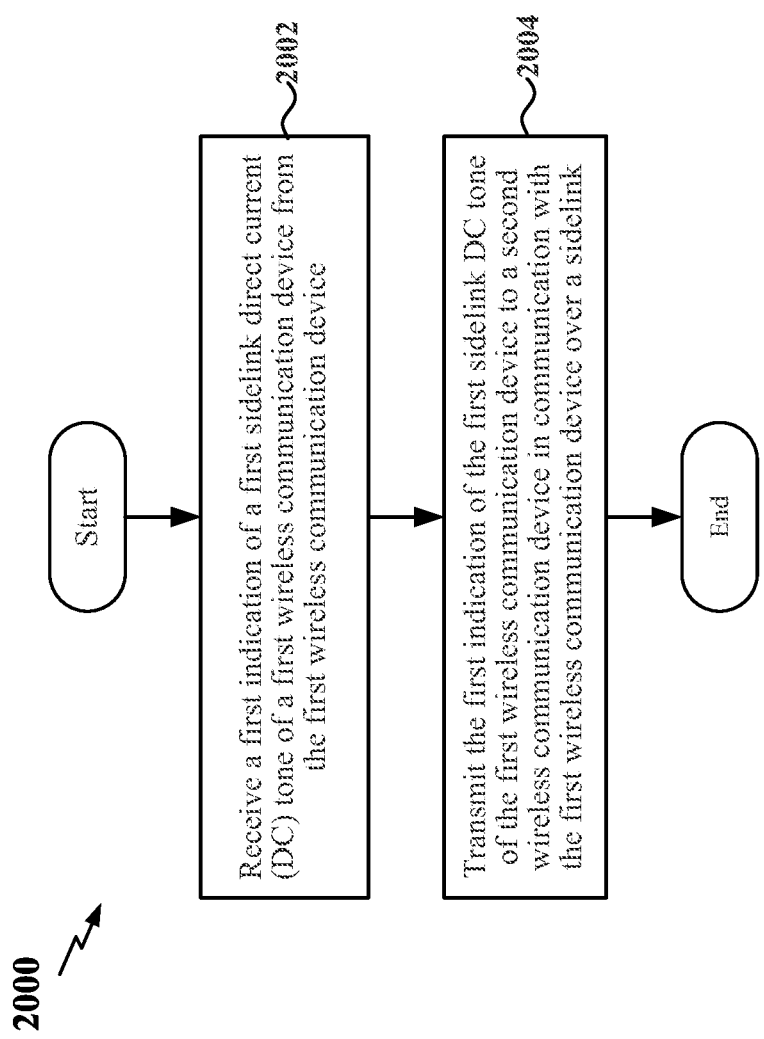
FIG. 20 is a flow chart of another exemplary method for sidelink DC tone indication according to some aspects.

FIG. 20 is a flow chart of another exemplary method 2000 for sidelink DC tone indication according to some aspects. As described below, some or all illustrated features may be omitted in a particular implementation within the scope of the present disclosure, and some illustrated features may not be required for implementation of all examples. In some examples, the method may be performed by the RAN entity 1400, as described above and illustrated in FIG. 14, by a processor or processing system, or by any suitable means for carrying out the described functions.

At block 2002, the RAN entity may receive a first indication of a first sidelink direct current (DC) tone of a first wireless communication device from the first wireless communication device. In some examples, the RAN entity may transmit a request to the first wireless communication device for the first sidelink DC tone of the first wireless communication device. For example, the SL DC tone manager circuitry 1446, together with the communication and processing circuitry 1444 and transceiver 1410, shown and described above in connection with FIG. 14 may provide a means for receiving the first indication of the first sidelink DC tone.

At block 2004, the RAN entity may transmit the first indication of the first sidelink DC tone of the first wireless communication device to a second wireless communication device in communication with the first wireless communication device over a sidelink. In some examples, the RAN entity may transmit a message including the first indication of the first sidelink DC tone of the first wireless communication device to the second wireless communication device. The message can include a radio resource control (RRC) message, a medium access control (MAC) control element (MAC-CE), or downlink control information (DCI). In some examples, the RAN entity may receive a request from the first wireless communication device to transmit the first sidelink DC tone of the first wireless communication device to the second wireless communication device. In some examples, the RAN entity may receive a request from the second wireless communication device for the first sidelink DC tone of the first wireless communication device.

In some examples, the RAN entity may further receive a second indication of a second sidelink direct current (DC) tone of the second wireless communication device from the second wireless communication device. In addition, the RAN entity may transmit the second indication of the second sidelink DC tone of the second wireless communication device to the first wireless communication device. For example, the SL DC tone manager circuitry 1446, together with the communication and processing circuitry 1444 and transceiver 1410 may provide a means to transmit the first indication of the first sidelink DC tone of the first wireless communication device to the second wireless communication device.

In 5G NR networks, a base station may be an aggregated base station, in which the radio protocol stack is logically integrated within a single RAN entity, or a disaggregated base station (e.g., a disaggregated RAN entity), in which the radio protocol stack is logically split between a central unit (CU) and one or more distributed units (DUs). The CU hosts the radio resource control (RRC), service data adaptation protocol (SDAP), and packet data convergence protocol (PDCP) layers that control the operation of one or more DUs. The DU hosts the radio link control (RLC), medium access control (MAC) and physical (PHY) layers. The CU may be implemented within an edge RAN node, which may be referred to as a donor node, while the one or more DUs may be co-located with the CU and/or distributed throughout multiple RAN nodes that may be physically separated from one another.

In some examples, the RAN entity 1400 shown and described above in connection with FIG. 14 may be a disaggregated base station. For example, the RAN entity 1400 shown in FIG. 14 may include the CU and optionally one or more DUs of the disaggregated base station. Other DUs associated with the RAN entity 1400 may be distributed throughout the network. In some examples, the DUs may correspond to TRPs associated with the RAN entity. In some examples, the CU and/or DU of the disaggregated base station (e.g., within the RAN entity 1400) may transmit a sidelink DC tone request and receive a sidelink DC tone report from a wireless communication device. The CU and/or DU may then transmit an RRC message including the SL DC tone of the wireless communication device to one or more other wireless communication device.

Figure 21:
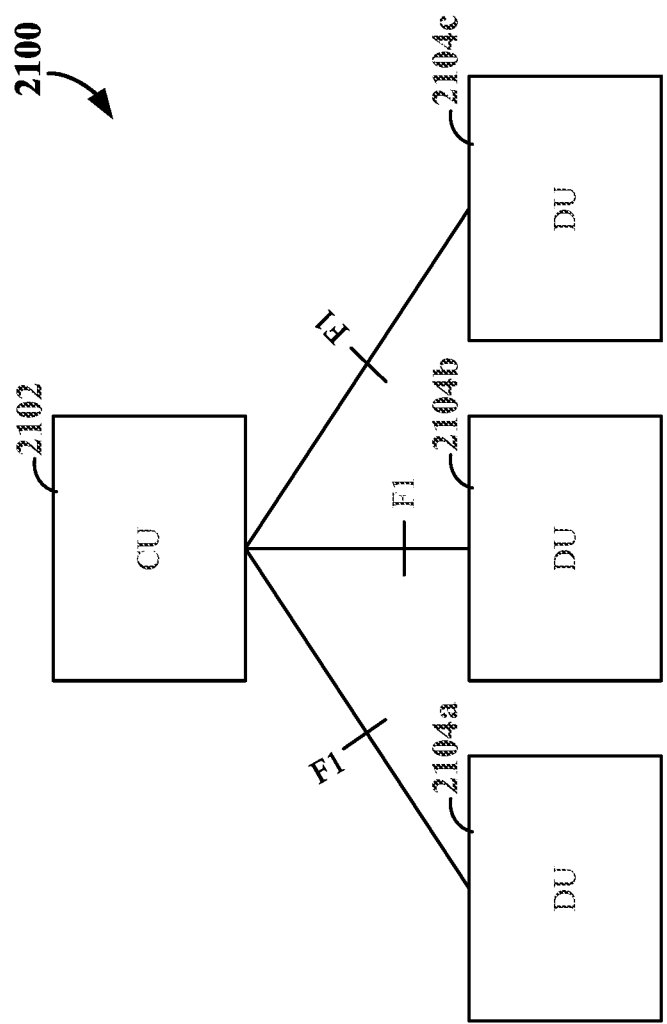
FIG. 21 is a diagram providing a high-level illustration of one example of a configuration of a disaggregated base station according to some aspects.

FIG. 21 is a diagram providing a high-level illustration of one example of a configuration of a dis aggregated base station 2100 according to some aspects. The disaggregated base station 2100 includes a CU 2102 and one or more DUs (three of which, 2104a, 2104b, 2104c, are shown for convenience). Each DU 2104a, 2104b, and 2104c supports the PHY, MAC, and RLC layers of the radio protocol stack. The CU 2102 supports the higher layers, such as the PDCP and RRC layers. One of the DUs (e.g., DU 2104a) may be co-located with the CU 2102, while the other DUs 2104b and 2104c may be distributed throughout a network. The CU 2102 and DUs 2104a, 2104b, and 2104c are logically connected via the F1 interface, which utilizes the F1 Application Protocol (F1-AP) for communication of information between the CU 2102 and each of the DUs 2104a, 2104b, and 2104c and for establishing generic tunneling protocol (GTP) tunnels between the DU and CU for each radio bearer.

Disaggregated base stations 2100 may be utilized, for example, in integrated access backhaul (IAB) networks. In such an IAB network, the wireless spectrum may be used for both access links and backhaul links. In some examples, the wireless spectrum may utilize millimeter-wave (mmWave) or sub-6 GHz carrier frequencies.

Figure 22:
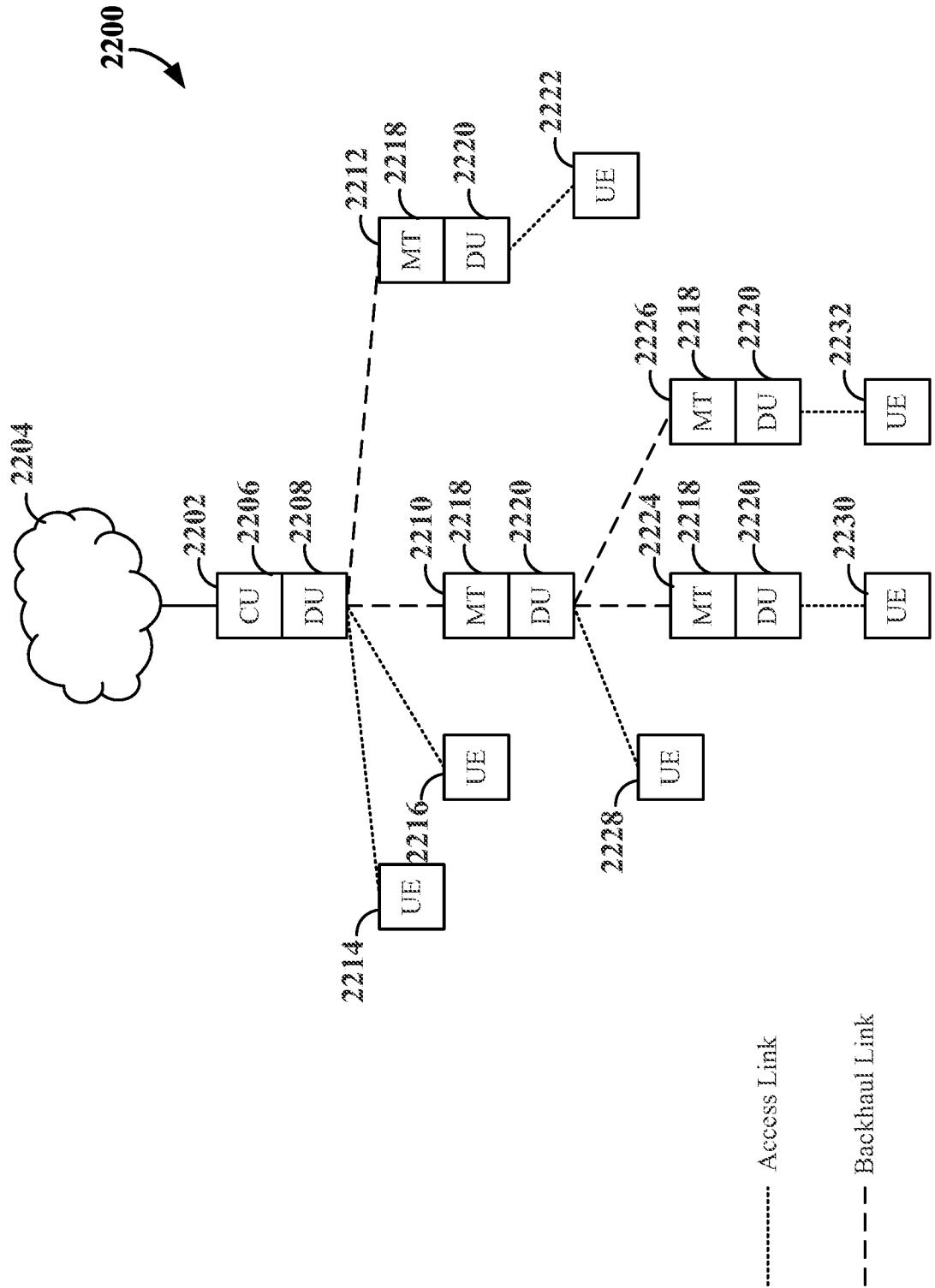
FIG. 22 is a diagram illustrating an example of an integrated access backhaul (IAB) network according to some aspects.

FIG. 22 is a diagram illustrating an example of an integrated access backhaul (IAB) network according to some aspects. In the example shown in FIG. 22, an IAB node 2202 is shown coupled to a core network 2204 via a wireline connection. This IAB node 2202 may be referred to herein as an IAB donor node, which may be, for example, an enhanced gNB including functionality for controlling the IAB network 2200. In some examples, the IAB donor node 2202 may include a central unit (CU) 2206 and a distributed unit (DU) 2208. The CU 2206 is configured to operate as a centralized network node (or central entity) within the IAB network 2200. For example, the CU 2206 may include radio resource control (RRC) layer functionality and packet data convergence protocol (PDCP) layer functionality to control/configure the other nodes (e.g., IAB nodes and UEs) within the IAB network 2200. Thus, the CU 2206 can be configured to implement centralized mechanisms for handover decisions, topology changes, routing, bearer mapping, UE security, and other suitable services.

The DU 2208 is configured to operate as a scheduling entity to schedule scheduled entities (e.g., other IAB nodes and UEs) of the IAB donor node 2202. For example, the DU 2208 of the IAB donor node 2202 may operate as a scheduling entity to schedule IAB nodes 2210 and 2212 and UEs 2214 and 2216. Thus, the DU 2208 of the IAB donor node 2202 may schedule communication with IAB nodes 2210 and 2212 via respective backhaul links and schedule communication with UEs 2214 and 2216 via respective access links. In some examples, the DU 2208 may include the radio link control (RLC), medium access control (MAC), and physical (PHY) layer functionality to enable operation as a scheduling entity.

Each of the IAB nodes 2210 and 2212 may be configured as a Layer 2 (L2) relay node including a respective DU 2220 and a mobile termination (MT) unit 2218 to enable each L2 relay IAB node 2210 and 2212 to operate as a scheduling entity and a scheduled entity. For example, the MT unit 2218 within each of the L2 relay IAB nodes 2210 and 2212 is configured to operate as a scheduled entity that may be scheduled by the IAB donor node 2202. Each MT unit 2218 within the L2 relay IAB nodes 2210 and 2212 further facilitates communication with the IAB donor node 2202 via respective backhaul links. In addition, the DU 2220 within each of the L2 relay IAB nodes 2210 and 2212 operates similar to the DU 2208 within the IAB donor node 2202 to function as a scheduling entity to schedule one or more respective scheduled entities (e.g., other IAB nodes and/or UEs) of the L2 relay IAB nodes 2210 and 2212.

For example, the DU 2220 of L2 relay IAB node 2212 functions as a scheduling entity to schedule communication with a UE 2222 via an access link, while the DU 2220 of L2 relay IAB node 2210 functions as a scheduling entity to schedule communication with the MT units 2218 of L2 relay IAB nodes 2224 and 2226 via respective backhaul links and a UE 2228 via an access link Each of the L2 relay IAB nodes 2224 and 2226 further includes a respective DU 2220 that functions as a scheduling entity to communicate with respective UEs 2230 and 2232.

In some examples, each of the IAB nodes 2202, 2210, 2212, 2224, and 2226 may be interconnected via one or more wireless backhaul links Each of the wireless backhaul links may utilize the same wireless spectrum (e.g., the radio frequency (RF) spectrum) as the access links to backhaul access traffic to/from the core network 2204. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any number of IAB nodes to form the IAB network 2200. In addition, some or all of the IAB nodes 2202, 2210, 2212, 2224, and 2226 may also be connected via wired backhaul links (e.g., fiber, coaxial cable, Ethernet, copper wires, etc.) and/or microwave backhaul links Thus, the IAB network 2200 may support both wired/microwave and wireless backhaul traffic.

In the network topology illustrated in FIG. 22, the IAB donor node 2202, in combination with each of the L2 relay IAB nodes 2210, 2212, 2224 and 2226, can collectively form a disaggregated base station. The disaggregated base station includes the CU 2206 and each of the DUs 2208 and 2222 controlled by the CU 2206. The CU/DU functional split in disaggregated base stations can facilitate the realization of time-critical services, such as scheduling, retransmission, segmentation, and other similar services in the DU 2208/2222, while centralizing the less time-critical services in the CU 2206. In addition, the CU/DU separation enables termination of external interfaces in the CU 2206 instead of each DU, and further supports centralized termination of the PCDP to allow for dual connectivity and handover between the different DUs of the disaggregated base station. It should be understood that disaggregated base stations may be implemented within networks other than IAB networks, and the present disclosure is not limited to any particular type of network configuration.

The following provides an overview of examples of the present disclosure.

Example 1: A method of sidelink wireless communication at a first wireless communication device, the method comprising: identifying a first sidelink direct current (DC) tone of the first wireless communication device; transmitting a first indication of the first sidelink DC tone of the first wireless communication device to a second wireless communication device via a sidelink between the first wireless communication device and the second wireless communication device; and receiving a second indication of a second sidelink DC tone of the second wireless communication device.

Example 2: The method of example 1, wherein the receiving the second indication of the second sidelink DC tone of the second wireless communication device comprises: receiving a sidelink medium access control-control element (MAC-CE) comprising the second indication of the second sidelink DC tone of the second wireless communication device from the second wireless communication device via the sidelink.

Example 3: The method of example 1 or 2, further comprising: transmitting a request to the second wireless communication device for the second indication of the second sidelink DC tone.

Example 4: The method of any of examples 1 through 3, wherein the receiving the second indication of the second sidelink DC tone of the second wireless communication device comprises: receiving a radio resource control (RRC) message comprising the second indication of the second sidelink DC tone of the second wireless communication device from a base station in wireless communication with the first wireless communication device and the second wireless communication device.

Example 5: The method of any of examples 1 through 4, wherein the RRC message further comprises an identifier of the second wireless communication device.

Example 6: The method of any of examples 1 through 5, further comprising: transmitting the first indication of the first sidelink DC tone of the first wireless communication device to a plurality of neighbor wireless communication devices.

Example 7: The method of any of examples 1 through 6, wherein the first sidelink DC tone is within a first sub-channel on which the first wireless communication device communicates over the sidelink with the second wireless communication device.

Example 8: The method of any of examples 1 through 6, wherein the first sidelink DC tone is within a second sub-channel different from a first sub-channel on which the first wireless communication device communicates over the sidelink with the second wireless communication device.

Example 9: The method of any of examples 1 through 8, wherein the transmitting the first indication of the first sidelink DC tone of the first wireless communication device to the second wireless communication device comprises: transmitting the first indication of the first sidelink DC tone of the first wireless communication device to the second wireless communication device within stage two sidelink control information (SCI) in a data region of a slot.

Example 10: The method of any of examples 1 through 9, further comprising: avoiding utilizing the second sidelink DC tone of the second wireless communication device in transmitting sidelink signals to the second wireless communication device.

Example 11: A method of sidelink wireless communication at a first wireless communication device, the method comprising: identifying a first sidelink direct current (DC) tone of the first wireless communication device; receiving a first indication of a second sidelink DC tone of a second wireless communication device from the second wireless communication device via a sidelink between the first wireless communication device and the second wireless communication device; and providing a second indication of the first sidelink DC tone of the first wireless communication device to the second wireless communication device.

Example 12: The method of example 11, wherein the providing the second indication of the first sidelink DC tone of the first wireless communication device comprises: transmitting a sidelink medium access control-control element (MAC-CE) comprising the second indication of the first sidelink DC tone of the second wireless communication device from the second wireless communication device via the sidelink.

Example 13: The method of example 11 or 12, further comprising: receiving a request from the second wireless communication device for the second indication of the first sidelink DC tone.

Example 14: The method of any of examples 11 through 13, wherein the providing the second indication of the first sidelink DC tone of the first wireless communication device comprises: transmitting the second indication of the first sidelink DC tone of the first wireless communication device to a base station in wireless communication with the first wireless communication device and the second wireless communication device for transmission of the second indication of the first sidelink DC tone of the first wireless communication device to the second wireless communication device.

Example 15: The method of any of examples 11 through 14, wherein the second sidelink DC tone is within a first sub-channel on which the second wireless communication device communicates over the sidelink with the first wireless communication device.

Example 16: The method of any of examples 11 through 15, wherein the second sidelink DC tone is within a second sub-channel different from a first sub-channel on which the second wireless communication device communicates over the sidelink with the first wireless communication device.

Example 17: The method of any of examples 11 through 16, wherein the receiving the first indication of the second sidelink DC tone of the second wireless communication device from the second wireless communication device comprises: receiving the first indication of the second sidelink DC tone of the second wireless communication device from the second wireless communication device within stage two sidelink control information (SCI) in a data region of a slot Example 18: The method of any of examples 11 through 17, further comprising: avoiding utilizing the second sidelink DC tone of the second wireless communication device in transmitting sidelink signals to the second wireless communication device.

Example 19: A user equipment (UE) configured for wireless communication comprising a processor, and a memory coupled to the processor, the processor and memory configured to perform a method of any one of examples 1 through 10 or 11 through 18.

Example 20: An apparatus configured for wireless communication comprising at least one means for performing a method of any one of examples 1 through 10 or 11 through 18.

Example 21: A non-transitory computer-readable medium storing computer-executable code, comprising code for causing an apparatus to perform a method of any one of examples 1 through 10 or 11 through 18.

Example 22: A method of sidelink wireless communication at a first wireless communication device, the method comprising: transmitting a first indication of a first sidelink direct current (DC) tone of the first wireless communication device to a second wireless communication device; and receiving a second indication of a second sidelink DC tone of the second wireless communication device.

Example 23: The method of example 22, wherein the transmitting the first indication comprises: transmitting the first indication of the first sidelink DC tone of the first wireless communication device to the second wireless communication device via a sidelink between the first wireless communication device and the second wireless communication device.

Example 24: The method of example 22 or 23, wherein the receiving the second indication of the second sidelink DC tone of the second wireless communication device comprises: receiving a sidelink medium access control-control element (MAC-CE) or a sidelink radio resource control (RRC) message comprising the second indication of the second sidelink DC tone of the second wireless communication device from the second wireless communication device.

Example 25: The method of any of examples 22 through 24, further comprising: transmitting a request to the second wireless communication device for the second indication of the second sidelink DC tone.

Example 26: The method of any of examples 22 through 25, wherein the transmitting the first indication of the first sidelink DC tone of the first wireless communication device to the second wireless communication device comprises: transmitting the first indication of the first sidelink DC tone of the first wireless communication device to the second wireless communication device within stage two sidelink control information (SCI) in a data region of a slot.

Example 27: The method of any of examples 22 through 26, wherein the receiving the second indication of the second sidelink DC tone of the second wireless communication device comprises: receiving a message comprising the second indication of the second sidelink DC tone of the second wireless communication device from a base station in wireless communication with the first wireless communication device and the second wireless communication device, the message comprising a radio resource control (RRC) message, a medium access control (MAC) control element (MAC-CE), or downlink control information (DCI).

Example 28: The method of example 27, wherein the message further comprises an identifier of the second wireless communication device.

Example 29: The method of any of examples 22 through 28, further comprising: transmitting the first indication of the first sidelink DC tone of the first wireless communication device to a plurality of neighbor wireless communication devices.

Example 30: The method of example 29, wherein the first sidelink DC tone is within a first sub-channel on which the first wireless communication device communicates over a sidelink with the second wireless communication device.

Example 31: The method of example 29, wherein the first sidelink DC tone is within a second sub-channel different from a first sub-channel on which the first wireless communication device communicates over a sidelink with the second wireless communication device.

Example 32: The method of any of examples 22 through 31, further comprising: avoiding utilizing the second sidelink DC tone of the second wireless communication device in transmitting sidelink signals to the second wireless communication device.

Example 33: A method of sidelink wireless communication at a second wireless communication device, the method comprising: receiving a first indication of a first sidelink direct current (DC) tone of a first wireless communication device from the first wireless communication device; and providing a second indication of a second sidelink DC tone of the second wireless communication device to the first wireless communication device.

Example 34: The method of example 33, wherein the receiving the first indication comprises: receiving the first indication of the first sidelink DC tone of the first wireless communication device from the first wireless communication device via a sidelink between the first wireless communication device and the second wireless communication device.

Example 35: The method of example 33 or 34, wherein the providing the second indication of the second sidelink DC tone of the second wireless communication device comprises: transmitting a sidelink medium access control-control element (MAC-CE) or sidelink radio resource control (RRC) message comprising the second indication of the second sidelink DC tone of the second wireless communication device to the first wireless communication device via a sidelink between the first wireless communication device and the second wireless communication device.

Example 36: The method of any of examples 33 through 35, wherein the receiving the first indication of the first sidelink DC tone of the first wireless communication device from the first wireless communication device comprises: receiving the first indication of the first sidelink DC tone of the first wireless communication device from the first wireless communication device within stage two sidelink control information (SCI) in a data region of a slot.

Example 37: The method of any of examples 33 through 36, further comprising: receiving a request from the first wireless communication device for the second indication of the second sidelink DC tone.

Example 38: The method of any of examples 33 through 37, wherein the providing the second indication of the second sidelink DC tone of the second wireless communication device comprises: transmitting the second indication of the second sidelink DC tone of the second wireless communication device to a base station in wireless communication with the first wireless communication device and the second wireless communication device for transmission of the second indication of the second sidelink DC tone of the second wireless communication device to the first wireless communication device.

Example 39: The method of any of examples 33 through 38, wherein the first sidelink DC tone is within a first sub-channel on which the first wireless communication device communicates over a sidelink with the second wireless communication device.

Example 40: The method of any of examples 33 through 38, wherein the first sidelink DC tone is within a second sub-channel different from a first sub-channel on which the first wireless communication device communicates over a sidelink with the second wireless communication device.

Example 41: The method of any of examples 33 through 40, further comprising: avoiding utilizing the first sidelink DC tone of the first wireless communication device in transmitting sidelink signals to the first wireless communication device.

Example 42: A wireless communication device configured for wireless communication comprising a processor, and a memory coupled to the processor, the processor and memory configured to perform a method of any one of examples 22 through 32 or 33 through 40.

Example 43: An apparatus configured for wireless communication comprising at least one means for performing a method of any one of examples 22 through 32 or 33 through 40.

Example 44: A non-transitory computer-readable medium storing computer-executable code, comprising code for causing an apparatus to perform a method of any one of examples 22 through 32 or 33 through 40.

Example 45: A method of wireless communication at a radio access network (RAN) entity, the method comprising: receiving a first indication of a first sidelink direct current (DC) tone of a first wireless communication device from the first wireless communication device; and transmitting the first indication of the first sidelink DC tone of the first wireless communication device to a second wireless communication device.

Example 46: The method of example 45, further comprising: receiving a second indication of a second sidelink direct current (DC) tone of the second wireless communication device from the second wireless communication device; and transmitting the second indication of the second sidelink DC tone of the second wireless communication device to the first wireless communication device.

Example 47: The method of example 45 or 46, wherein the transmitting the first indication of the first sidelink DC tone of the first wireless communication device comprises: transmitting a message comprising the first indication of the first sidelink DC tone of the first wireless communication device to the second wireless communication device, the message comprising a radio resource control (RRC) message, a medium access control (MAC) control element (MAC-CE), or downlink control information (DCI).

Example 48: The method of any of examples 45 through 47, further comprising: receiving a request from the first wireless communication device to transmit the first sidelink DC tone of the first wireless communication device to the second wireless communication device.

Example 49: The method of any of examples 45 through 47, further comprising: receiving a request from the second wireless communication device for the first sidelink DC tone of the first wireless communication device.

Example 50: The method of any of examples 45 through 49, further comprising: transmitting a request to the first wireless communication device for the first sidelink DC tone of the first wireless communication device.

Example 51: A radio access network (RAN) entity configured for wireless communication comprising a processor, and a memory coupled to the processor, the processor and memory configured to perform a method of any one of examples 45 through 50.

Example 52: An apparatus configured for wireless communication comprising at least one means for performing a method of any one of examples 45 through 50.

Example 53: A non-transitory computer-readable medium storing computer-executable code, comprising code for causing an apparatus to perform a method of any one of examples 45 through 50.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-3, 6, 7, 9, 11, 14, 16, and/or 17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured for wireless communication at a first wireless communication device, comprising:
   one or more memories; and
   one or more processors coupled to the one or more memories, wherein the one or more processors are configured to cause the first wireless communication device to:
      transmit a first indication of a first sidelink direct current (DC) tone of the first wireless communication device to a second wireless communication device; and
      receive a message comprising a second indication of a second sidelink DC tone of the second wireless communication device from a network entity, the message comprising at least one of a radio resource control (RRC) message, a medium access control (MAC) control element (MAC-CE), or downlink control information (DCI), the message further comprising an identifier of the second wireless communication device.

2. The apparatus of claim 1, wherein the one or more processors are further configured to cause the first wireless communication device to:
   transmit the first indication of the first sidelink DC tone of the first wireless communication device to the second wireless communication device via a sidelink between the first wireless communication device and the second wireless communication device.

3. The apparatus of claim 1, wherein the one or more processors are further configured to cause the first wireless communication device to:
   transmit the first indication of the first sidelink DC tone of the first wireless communication device to the second wireless communication device within stage two sidelink control information (SCI) in a data region of a slot.

4. The apparatus of claim 1, further comprising:
   one or more antennas, wherein the one or more processors are further configured to cause the first wireless communication device to:
      transmit the first indication of the first sidelink DC tone of the first wireless communication device to a plurality of neighbor wireless communication devices via the one or more antennas.

5. The apparatus of claim 4, wherein the first sidelink DC tone is within a first sub-channel on which the first wireless communication device communicates over a sidelink with the second wireless communication device.

6. The apparatus of claim 4, wherein the first sidelink DC tone is within a second sub-channel different from a first sub-channel on which the first wireless communication device communicates over a sidelink with the second wireless communication device.

7. The apparatus of claim 1, wherein the one or more processors are further configured to cause the first wireless communication device to:
   avoid utilizing in operation the second sidelink DC tone of the second wireless communication device in transmitting sidelink signals to the second wireless communication device.

8. An apparatus configured for wireless communication at a second wireless communication device, comprising:
   one or more memories;
   one or more processors coupled to the one or more memories, wherein the one or more processors are configured to cause the second wireless communication device to:
      receive a first indication of a first sidelink direct current (DC) tone of a first wireless communication device from the first wireless communication device within stage two sidelink control information in a data region of a slot; and
      provide a second indication of a second sidelink DC tone of the second wireless communication device to the first wireless communication device.

9. The apparatus of claim 8, wherein the one or more processors are further configured to cause the second wireless communication device to:
   receive the first indication of the first sidelink DC tone of the first wireless communication device from the first wireless communication device via a sidelink between the first wireless communication device and the second wireless communication device.

10. The apparatus of claim 8, wherein the one or more processors are further configured to:
    transmit at least one of a sidelink medium access control—control element (MAC-CE) or sidelink radio resource control (RRC) message comprising the second indication of the second sidelink DC tone of the second wireless communication device to the first wireless communication device via a sidelink between the first wireless communication device and the second wireless communication device.

11. The apparatus of claim 8, further comprising:
    a transceiver, wherein the one or more processors are further configured to cause the second wireless communication device to:
       receive a request from the first wireless communication device for the second indication of the second sidelink DC tone via the transceiver.

12. The apparatus of claim 8, wherein the one or more processors are further configured to cause the second wireless communication device to:
    transmit the second indication of the second sidelink DC tone of the second wireless communication device to a network entity in wireless communication with the first wireless communication device and the second wireless communication device for transmission of the second indication of the second sidelink DC tone of the second wireless communication device to the first wireless communication device.

13. The apparatus of claim 8, wherein the first sidelink DC tone is within a first sub-channel on which the first wireless communication device communicates over a sidelink with the second wireless communication device.

14. The apparatus of claim 8, wherein the first sidelink DC tone is within a second sub-channel different from a first sub-channel on which the first wireless communication device communicates over a sidelink with the second wireless communication device.

15. The apparatus of claim 8, wherein the one or more processors are further configured to cause the second wireless communication device to:
avoid utilizing in operation the first sidelink DC tone of the first wireless communication device in transmitting sidelink signals to the first wireless communication device.

16. An apparatus configured for wireless communication at a network entity, comprising:
one or more memories;
one or more processors coupled to the one or more memories, wherein the one or more processors are configured to cause the network entity to:
obtain a first indication of a first sidelink direct current (DC) tone of a first wireless communication device from the first wireless communication device; and
provide a message comprising the first indication of the first sidelink DC tone of the first wireless communication device to a second wireless communication device, the message comprising at least one of a radio resource control (RRC) message, a medium access control (MAC) control element (MAC-CE), or downlink control information (DCI), the message further comprising an identifier of the second wireless communication device.

17. The apparatus of claim 16, wherein the one or more processors are further configured to cause the network entity to:
obtain a second indication of a second sidelink direct current (DC) tone of the second wireless communication device from the second wireless communication device; and
provide the second indication of the second sidelink DC tone of the second wireless communication device to the first wireless communication device.

18. The apparatus of claim 16, wherein the one or more processors are further configured to cause the network entity to:
obtain a request from the first wireless communication device to transmit the first sidelink DC tone of the first wireless communication device to the second wireless communication device.

19. The apparatus of claim 16, wherein the one or more processors are further configured to cause the network entity to:
obtain a request from the second wireless communication device for the first sidelink DC tone of the first wireless communication device.

20. The apparatus of claim 16, further comprising:
one or more antennas, and wherein the one or more processors are further configured to cause the network entity to:
provide a request to the first wireless communication device for the first sidelink DC tone of the first wireless communication device via the one or more antennas.

21. A method of sidelink wireless communication at a first wireless communication device, the method comprising:
transmitting a first indication of a first sidelink direct current (DC) tone of the first wireless communication device to a second wireless communication device; and
receiving a message comprising a second indication of a second sidelink DC tone of the second wireless communication device from a network entity, the message comprising at least one of a radio resource control (RRC) message, a medium access control (MAC) control element (MAC-CE), or downlink control information (DCI), the message further comprising an identifier of the second wireless communication device.

22. The method of claim 21, wherein the transmitting the first indication comprises:
transmitting the first indication of the first sidelink DC tone of the first wireless communication device to the second wireless communication device via a sidelink between the first wireless communication device and the second wireless communication device.

23. The method of claim 21, wherein the transmitting the first indication of the first sidelink DC tone of the first wireless communication device to the second wireless communication device comprises:
transmitting the first indication of the first sidelink DC tone of the first wireless communication device to the second wireless communication device within stage two sidelink control information (SCI) in a data region of a slot.

24. A method of sidelink wireless communication at a second wireless communication device, the method comprising:
receiving a first indication of a first sidelink direct current (DC) tone of a first wireless communication device from the first wireless communication device within stage two sidelink control information in a data region of a slot; and
providing a second indication of a second sidelink DC tone of the second wireless communication device to the first wireless communication device.

25. The method of claim 24, further comprising:
receiving the first indication of the first sidelink DC tone of the first wireless communication device from the first wireless communication device via a sidelink between the first wireless communication device and the second wireless communication device.

26. The method of claim 24, further comprising:
transmitting at least one of a sidelink medium access control—control element (MAC-CE) or sidelink radio resource control (RRC) message comprising the second indication of the second sidelink DC tone of the second wireless communication device to the first wireless communication device via a sidelink between the first wireless communication device and the second wireless communication device.

27. A method of wireless communication at a network entity, the method comprising:
obtaining a first indication of a first sidelink direct current (DC) tone of a first wireless communication device from the first wireless communication device; and
providing a message comprising the first indication of the first sidelink DC tone of the first wireless communication device to a second wireless communication device, the message comprising at least one of a radio resource control (RRC) message, a medium access control (MAC) control element (MAC-CE), or downlink control information (DCI), the message further comprising an identifier of the second wireless communication device.

28. The method of claim 27, further comprising:
obtaining a second indication of a second sidelink direct current (DC) tone of the second wireless communication device from the second wireless communication device; and providing the second indication of the second sidelink DC tone of the second wireless communication device to the first wireless communication device.

29. A non-transitory computer-readable medium having stored therein instructions executable by one or more processors of a first wireless communication device to:
   transmit a first indication of a first sidelink direct current (DC) tone of the first wireless communication device to a second wireless communication device; and
   receive a message comprising a second indication of a second sidelink DC tone of the second wireless communication device from a network entity, the message comprising a radio resource control (RRC) message, a medium access control (MAC) control element (MAC-CE), or downlink control information (DCI), the message further comprising an identifier of the second wireless communication device.

30. The non-transitory computer-readable medium of claim 29, further comprising instructions executable by the one or more processors of the first wireless communication device to:
   transmit the first indication of the first sidelink DC tone of the first wireless communication device to the second wireless communication device via a sidelink between the first wireless communication device and the second wireless communication device.

31. The non-transitory computer-readable medium of claim 29, further comprising instructions executable by the one or more processors of the first wireless communication device to:
   transmit the first indication of the first sidelink DC tone of the first wireless communication device to the second wireless communication device within stage two sidelink control information (SCI) in a data region of a slot.

32. A non-transitory computer-readable medium having stored therein instructions executable by one or more processors of a second wireless communication device to:
   receive a first indication of a first sidelink direct current (DC) tone of a first wireless communication device from the first wireless communication device within stage two sidelink control information in a data region of a slot; and
   provide a second indication of a second sidelink DC tone of the second wireless communication device to the first wireless communication device.

33. The non-transitory computer-readable medium of claim 32, further comprising instructions executable by the one or more processors of the second wireless communication device to:
   receive the first indication of the first sidelink DC tone of the first wireless communication device from the first wireless communication device via a sidelink between the first wireless communication device and the second wireless communication device.

34. The non-transitory computer-readable medium of claim 32, further comprising instructions executable by the one or more processors of the second wireless communication device to:
   transmit at least one of a sidelink medium access control—control element (MAC-CE) or sidelink radio resource control (RRC) message comprising the second indication of the second sidelink DC tone of the second wireless communication device to the first wireless communication device via a sidelink between the first wireless communication device and the second wireless communication device.

35. A non-transitory computer-readable medium having stored therein instructions executable by one or more processors of a network entity to:
   obtain a first indication of a first sidelink direct current (DC) tone of a first wireless communication device from the first wireless communication device; and
   provide a message comprising the first indication of the first sidelink DC tone of the first wireless communication device to a second wireless communication device, the message comprising a radio resource control (RRC) message, a medium access control (MAC) control element (MAC-CE), or downlink control information (DCI), the message further comprising an identifier of the second wireless communication device.

36. The non-transitory computer-readable medium of claim 35, further comprising instructions executable by the one or more processors of the network entity to:
   obtain a second indication of a second sidelink direct current (DC) tone of the second wireless communication device from the second wireless communication device; and
   provide the second indication of the second sidelink DC tone of the second wireless communication device to the first wireless communication device.

* * * * *